US010909790B2

(12) United States Patent
Jansen et al.

(10) Patent No.: US 10,909,790 B2
(45) Date of Patent: Feb. 2, 2021

(54) COMPARTMENT SYSTEM

(71) Applicants: Jochen Jansen, Bonn (DE); Ramin Benz, Bonn (DE); Christoph Dautz, Bonn (DE); Christian Carstens, Windhagen (DE); Dirk Schusdziara, Bonn (DE); Erwin Hirtreiter, Traitsching (DE); Franz A. Schießl, Großaign (DE); Christian Eisenhart, Neukirchen-Balbini (DE); Stanislav Bulygin, Filderstadt (DE)

(72) Inventors: Jochen Jansen, Bonn (DE); Ramin Benz, Bonn (DE); Christoph Dautz, Bonn (DE); Christian Carstens, Windhagen (DE); Dirk Schusdziara, Bonn (DE); Erwin Hirtreiter, Traitsching (DE); Franz A. Schießl, Großaign (DE); Christian Eisenhart, Neukirchen-Balbini (DE); Stanislav Bulygin, Filderstadt (DE)

(73) Assignee: Deutsche Post AG, Bonn (DE)

( * ) Notice: Subject to any disclaimer, the term of this patent is extended or adjusted under 35 U.S.C. 154(b) by 557 days.

(21) Appl. No.: 15/627,205

(22) Filed: Jun. 19, 2017

(65) Prior Publication Data
US 2017/0287244 A1 Oct. 5, 2017

Related U.S. Application Data

(63) Continuation of application No. PCT/EP2015/058836, filed on Apr. 23, 2015.

(30) Foreign Application Priority Data

Dec. 23, 2014 (DE) .................. 10 2014 119 557

(51) Int. Cl.
*G07C 9/27* (2020.01)
*A47G 29/14* (2006.01)
(Continued)

(52) U.S. Cl.
CPC ............. *G07C 9/27* (2020.01); *A47G 29/141* (2013.01); *G06Q 10/0836* (2013.01);
(Continued)

(58) Field of Classification Search
CPC ............ G07C 9/00103; G07C 9/00896; G07C 2009/0092; G07C 2009/00833;
(Continued)

(56) References Cited

U.S. PATENT DOCUMENTS

| | | | | |
|---|---|---|---|---|
| 2002/0080030 A1* | 6/2002 | Inomata | ................... | G07F 17/12 340/542 |
| 2013/0261792 A1* | 10/2013 | Gupta | .................... | G06Q 10/08 700/232 |

(Continued)

FOREIGN PATENT DOCUMENTS

| | | |
|---|---|---|
| CN | 1771000 A | 5/2006 |
| CN | 103210165 A | 7/2013 |

(Continued)

OTHER PUBLICATIONS

Y. L. Lay, Biometric Locker System, 2011, p. 1-4 (Year: 2011).*

*Primary Examiner* — George Chen
*Assistant Examiner* — Ibrahim N El-Bathy
(74) *Attorney, Agent, or Firm* — Reinhart Boerner Van Deuren P.C.

(57) ABSTRACT

Provided is a method involving obtaining an identifier at a control unit of a compartment system having compartments provided with respective locks and respective lock control units that are configured to communicate with the control unit; obtaining information indicating that one compartment (Continued)

has been closed, and causing storing of the identifier in the lock control unit assigned to the compartment. Also provided is a method comprising detecting, at a lock control unit assigned to a compartment of a compartment system comprising a control unit and compartments provided with respective locks and lock control units configured to communicate with the control unit, that the compartment has been closed; transmitting a piece of information identifying the lock control unit to the control unit if it has been detected that the compartment has been closed; obtaining an identifier from the control unit; and storing the identifier in the lock control unit.

25 Claims, 15 Drawing Sheets

(51) Int. Cl.
*G07F 17/12* (2006.01)
*G06Q 20/08* (2012.01)
*G07F 5/26* (2006.01)
*G06Q 20/12* (2012.01)
*G06Q 10/08* (2012.01)
*G07C 9/00* (2020.01)

(52) U.S. Cl.
CPC ....... *G06Q 20/0855* (2013.01); *G06Q 20/127* (2013.01); *G07C 9/00571* (2013.01); *G07C 9/00896* (2013.01); *G07F 5/26* (2013.01); *G07F 17/12* (2013.01); *A47G 2029/149* (2013.01); *G06Q 10/083* (2013.01); *G07C 2009/0092* (2013.01); *G07C 2009/00833* (2013.01)

(58) Field of Classification Search
CPC .......... A47G 29/141; A47G 2029/149; G06Q 10/0836; G06Q 10/083; G07F 17/12
See application file for complete search history.

(56) References Cited

U.S. PATENT DOCUMENTS

| 2013/0317693 | A1* | 11/2013 | Jefferies | ................ | G07B 15/00 701/31.5 |
| 2015/0120602 | A1* | 4/2015 | Huffman | .............. | G06Q 10/083 705/339 |

FOREIGN PATENT DOCUMENTS

| CN | 103679958 A | 3/2014 |
| DE | 102 46 650 A1 | 4/2004 |
| DE | 103 01 137 A1 | 7/2004 |
| DE | 600 31 294 T2 | 5/2007 |
| DE | 10 2013 111 226 A1 | 4/2014 |
| EP | 2 229 767 B1 | 5/2013 |
| WO | WO 00/51750 A1 | 9/2000 |
| WO | WO 01/30213 A2 | 5/2001 |

* cited by examiner

COMPARTMENT SYSTEM

CROSS-REFERENCE TO RELATED PATENT APPLICATIONS

This patent application is a continuation of PCT/EP2015/058836, filed Apr. 23, 2015, which claims priority to German Application No. 10 2014 119 557.4, filed Dec. 23, 2014, the entire teachings and disclosure of which are incorporated herein by reference thereto.

FIELD OF THE INVENTION

Exemplary embodiments of the invention relate to a compartment system for placing and/or collecting shipments, to the components of said system, in particular a control unit and a lock control unit, and to methods performed by these components.

BACKGROUND OF THE INVENTION

Compartment systems are used in various ways, for example in the form of locker or parcel compartment systems. One example of a parcel compartment system is the applicant's packing station to which a recipient can have shipments delivered. The shipment is placed by the delivery agent in a compartment of a packing station in the vicinity of the recipient, the compartment is closed and the recipient is accordingly notified. The recipient can then open the compartment using a code, for example, and can remove the shipment. As a result of the packing station, there is no need for the recipient to have to be at home during delivery of a shipment. In addition, the packing station can be visited by the recipient at any desired time and the shipment can be removed since no staff must be present in order to remove the shipment.

In order to make the receipt of shipments even more convenient for the recipient, the applicant provides, as a further delivery variant, the delivery of shipments to a parcel box. In terms of the concept, a parcel box is designed in a similar manner to a mailbox, that is to say is assigned to a recipient (or a small group of recipients, for example a family), but is provided with a greater capacity. Both the delivery agent and the recipient can open the parcel box using electronic keys. The parcel box is preferably attached to or installed on or in front of the recipient's house. In comparison with the packing station, this dispenses with the route to the packing station for the recipient while retaining the advantage that the recipient does not need to be at home during delivery and can remove the shipment from the parcel box in any desired period. The recipient can also handle returns via the parcel box, that is to say can have shipments collected.

SUMMARY OF SOME EXEMPLARY EMBODIMENTS OF THE INVENTION

The parcel box is substantially aimed at joint use by a few recipients. However, it would be desirable to also make the advantages of delivering and/or collecting shipments by means of the parcel box available to a larger group of recipients without each of the recipients having to purchase a respective parcel box. In particular, a possibility of delivering and/or collecting shipments for use in apartment buildings would be desirable, which could replace or supplement the mailbox systems present there.

A first exemplary aspect of the invention discloses a method comprising:
- obtaining a first identifier, which is associated with at least one person, at a control unit of a compartment system which, in addition to the control unit, has a plurality of compartments provided with respective locks and lock control units which are respectively assigned to the compartments and are configured to communicate with the control unit,
- obtaining information indicating that one compartment of the plurality of compartments has been closed or that at least one shipment from or for the person has been placed in one compartment of the plurality of compartments and the compartment has been closed, and
- causing storing of the first identifier in the lock control unit assigned to the compartment.

A second exemplary aspect of the invention discloses a method comprising:
- detecting, at a lock control unit assigned to a compartment of a compartment system comprising a control unit and a plurality of compartments provided with respective locks and lock control units assigned to the compartments and configured to communicate with the control unit, that the compartment has been closed or that at least one shipment from or for a person has been placed in the compartment and the compartment has been closed,
- transmitting at least one piece of information identifying the lock control unit to the control unit if it has been detected that the compartment has been closed or that at least one shipment from or for a person has been placed in the compartment and the compartment has been closed,
- obtaining a first identifier, which is associated at least with one person, from the control unit, and
- storing the first identifier in the lock control unit.

Each of these aspects of the invention furthermore respectively discloses:
- a computer program comprising program instructions which cause a processor to perform and/or control the method according to the respective aspect of the invention when the computer program runs on the processor. In this specification, a processor is intended to be understood as meaning, inter alia, control units, microprocessors, microcontrol units such as microcontrollers, digital signal processors (DSP), application-specific integrated circuits (ASICs) or field programmable gate arrays (FPGAs). In this case, either all steps of the method can be controlled or all steps of the method can be performed or one or more steps can be controlled and one or more steps can be performed. The computer program may be distributable, for example, via a network such as the Internet, a telephone or mobile radio network and/or a local area network. The computer program may be at least partially software and/or firmware of a processor. It may likewise be at least partially implemented as hardware. The computer program may be stored, for example, on a computer-readable storage medium, for example a magnetic, electrical, optical and/or other type of storage medium. The storage medium may be, for example, part of the processor, for example a (non-volatile or volatile) program memory of the processor or a part thereof. The storage medium may be a tangible or physical storage medium, for example.
- An apparatus configured to perform and/or control the method according to the respective aspect of the invention or comprising respective means for performing and/or controlling the steps of the method according to the respective aspect of the invention. In this case, either all steps of the method can be controlled or all steps of the method can be performed or one or more steps can be controlled and one or more steps can be performed. One or more of the means may also be performed and/or controlled by the same unit. For example, one or more of the means may be formed by one or more processors.

An apparatus comprising at least one processor and at least one memory which contains program code, wherein the memory and the program code are configured to cause an apparatus with the at least one processor to perform and/or control at least the method according to the respective aspect of the invention. In this case, either all steps of the method can be controlled or all steps of the method can be performed or one or more steps can be controlled and one or more steps can be performed.

An apparatus according to the first aspect of the invention may be a control unit of the compartment system, for example.

An apparatus according to the second aspect of the invention may be a lock control unit of the compartment system, for example.

A third exemplary aspect of the invention discloses a compartment system comprising a control unit according to the first aspect of the invention and a plurality of lock control units according to the second aspect of the invention.

A fourth exemplary aspect of the invention discloses the use of a compartment system according to the third aspect of the invention for placing, in particular delivering, and/or collecting shipments.

These four exemplary aspects of the present invention have, inter alia, the—partially exemplary—properties described below.

The compartment system comprises a plurality of compartments, a plurality of lock control units each assigned to the compartments and at least one control unit.

The compartments are configured, for example, to receive shipments (for example letters, parcels, small packages, spare parts, food, etc.). The compartments are each closable, for example by means of a respective door or flap. For example, the compartments are substantially cuboidal receiving containers which are provided with doors or flaps on one or more sides. For example, a plurality of compartments are arranged above one another and/or beside one another in the compartment system. For example, the compartment system may consist of one or more modules arranged beside one another, wherein one or more compartments are arranged above one another in each module. The respective doors of the compartments are then hinged at the side, for example, and can be opened to the front, for example. The compartments of the compartment system may all have the same size. Alternatively, at least some compartments of the compartment system may have different sizes. The sizes may be adapted, for example, to conventional different shipment sizes (for example parcel sizes). The compartment system may have compartments for letters (mail compartments) and/or compartments for parcels (parcel compartments), for example. The mail compartments each have the same size inside the compartment system, for example, but two or more different sizes are also possible. The parcel compartments may be represented with only an identical size or with different sizes in the compartment system.

Each of the compartments is provided with a respective lock (which, however, can in turn comprise, for example, a plurality of components, for example a plurality of locking units). The lock of a compartment can be arranged, for example, in or on the compartment, for example on a door or flap of the compartment. If the lock is not arranged on the door or flap (that is to say on a side wall of the compartment, for example), it interacts with the door or flap, for example, by virtue of a bolt, for example, being inserted into an opening in the door or flap and being pulled out again. Alternatively, a hook fitted to the door or flap, for example, can be insertable into an opening in the lock in order to be locked/unlocked there. If the lock is fitted to the door or flap, for example, it can interact, for example, with the walls of the compartment, for example by inserting/pulling out bolts in openings in the walls or by receiving a hook fitted to the walls in the lock and by accordingly locking/unlocking it.

The lock of a respective compartment is controllable, in particular in electronic form, by means of a respective lock control unit In particular, at least the process of locking and/or unlocking the lock can be controlled by the lock control unit. Optionally, the lock control unit may also be configured to activate and/or deactivate the locking function (for example a latch function) of the lock. The lock control unit may comprise, for example, a processor, for example a microprocessor. The lock control unit is arranged, for example, in or on the compartment whose lock it controls. The lock control unit is configured, for example, only to control precisely one lock. The lock control unit may be accommodated, for example together with the lock, in a lock module. Assigning the lock to the compartment and assigning the lock control unit to the lock means that there is also a direct assignment of the lock control unit to the compartment. The lock control unit may communicate, for example, with one or more sensors or may comprise the latter in order to detect, for example, whether the compartment assigned to it is open or closed.

A compartment of the compartment system may be either open or closed. In the open state of the compartment, the lock of the compartment is unlocked. The door or flap of the compartment can then be opened by a person without the use of force, for example, or is open. In contrast, in the closed state of the compartment, the lock of the compartment is locked. The door or flap of the compartment can then no longer be opened by a person, who does not have the electronic key for opening, without the use of force, for example.

The compartment system further comprises a control unit. The control unit may be designed, for example, to at least partially control a plurality of lock control units of the compartment system. For example, only one control unit may be provided in the compartment system, or else a plurality of control units are possible which then at least partially control respective (for example disjoint) groups of lock control units, for example. The control unit is arranged spatially separate from the lock control units, for example. The control unit, on the one hand, and the lock control units, on the other hand, each have their own processors, for example.

The lock control units are configured to communicate with the control unit. This may be bidirectional communication, for example. Communication is physically carried out, for example, via a bus, for example the Controller Area Network (CAN) bus which is standardized according to ISO 11898.

The method according to the first aspect of the invention is performed, for example, by a component of the compartment system, in particular a control unit of the compartment system or a component (for example a processor) of the control unit.

In this case, a first identifier, which is associated with at least one person, is obtained at the control unit. The first identifier may have been transmitted, for example, from an apparatus to the control unit (or to a component of the control unit), for example by means of wireless or wired communication. For example, the first identifier is stored on a Near Field Communication (NFC) tag, a Radio Frequency Identification (RFID) tag or a portable electronic communication device, for example a mobile telephone, belonging to the person associated with the first identifier, or on an NFC tag, an RFID tag or a portable electronic communication device, in particular a handheld scanner, belonging to a delivery agent—possibly in addition to a plurality of further first identifiers each associated with other persons. The first identifier can be transmitted from the NFC tag using NFC technology, for example, and can be transmitted from the RFID tag using RFID technology. The first identifier can be transmitted from the communication device, for example, using NFC technology, RFID technology or Bluetooth, to name just a few examples. RFID and NFC are specified, for example, according to the ISO standards 18000, 11784/11785 and the ISO/IEC standard 14443-A and 15693. The Bluetooth specifications are available from www[dot]Bluetooth[dot]org. Alternatively, the first identifier may have been transmitted from a person (for example from the delivery agent or from the person associated with the first identifier) to the control unit (or to a component of the control unit) or may have been input to the control unit, for example using a keyboard.

The first identifier is associated with a person, for example, by being assigned to the person. The person may have registered for use of the compartment system, for example, and may have been assigned the first identifier in the process, for example by a management system which manages one or more compartment systems. The first identifier may also be associated with a plurality of persons, for example with all members of a family which has registered to use the compartment system (and, for example, together wish to use one or more compartments of the compartment system, in particular a mail compartment and one or more parcel compartments).

After obtaining the first identifier at the control unit, a piece of information is obtained (for example likewise at the control unit) indicating that a compartment has been closed or that at least one shipment from or for the person has been placed in one compartment of the plurality of compartments and the compartment has been closed. From the point of view of the control unit, this information reflects the fact that a shipment has been placed in the compartment—either by a delivery agent or by the person associated with the first identifier—and the compartment has been closed. The information may have been captured, for example, by a sensor (for example a sensor of the lock control unit). In this case, only the information indicating that a compartment has been closed may have been captured, for example, or the information indicating that at least one shipment has also actually been placed in the compartment may have been additionally captured. In the former case, it can nevertheless be assumed that the compartment is closed only if a shipment has also been placed in the compartment.

The method according to the first aspect of the invention further comprises causing storing of the first identifier in the lock control unit assigned to the compartment. This can be initiated, for example, by obtaining the information indicating that one compartment of the plurality of compartments has been closed or that at least one shipment from or for the person has been placed in one compartment of the plurality of compartments and the compartment has been closed, or may be dependent on further factors, for example the obtaining of information indicating that a particular interaction with a user interface of the compartment system has taken place, that is to say a particular button of the compartment system has been actuated, for example. This storing is caused, for example, by the control unit transmitting a corresponding command to be performed by the relevant lock control unit and by the lock control unit then carrying out the storing.

As a result of the first identifier being stored in the lock control unit of the closed compartment, the control unit assigns this compartment to the person associated with the first identifier. If this person now wishes to remove his/her delivered shipment from the compartment system, for example, he/she can in turn present the first identifier to the control unit which then decides, on the basis of the first identifier, which compartment (or which compartments) is assigned to this person and can therefore be opened for this person.

Storing the first identifier in lock control units of closed (and therefore occupied) compartments also allows a dynamic assignment of compartments to persons. Only a respective first identifier needs to be allocated to the persons, this allocation being valid for a long period, for example for a plurality of years or until the person deregisters from a management system of the compartment system. The respective first identifier of a person is then used to allocate a compartment to the person when necessary by storing the respective first identifier of the person in the lock control unit of the allocated compartment. After completing a process of placing or collecting a shipment by removing the shipment from the compartment, the first identifier is then deleted from the lock control unit again, for example. This makes it possible to dynamically allocate the compartments of the compartment system to a set of persons. Since not all persons in the set of persons have shipments delivered via the compartment system or provide shipments for collection every day, it is also advantageously possible to achieve the situation in which a number of compartments which is smaller than the set of persons is dynamically allocated to the set of persons. Therefore, the dimensions of the compartment system can be kept within a reasonable framework.

In addition, the first identifier stored in a lock control unit can also be used as an indicator of whether the compartment is occupied or free. Compartments whose lock control units have stored a first identifier are occupied, whereas compartments whose lock control units have not stored an identifier associated with a person are free.

According to the first aspect of the invention, the first identifier is stored in a decentralized manner in the lock control units, in order to allocate the compartment assigned to the respective lock control unit to a person associated with the first identifier, and is not stored centrally in the control unit of the compartment system, for instance. This makes it possible, inter alia, to also subsequently (for example after being activated for the first time) expand the number of compartments (and therefore the lock control units) in any desired manner without the need for changes to the control unit (for example to the dimension of an assignment table of compartments to identifiers which is present there or to the assignment table itself if identifiers of the lock control units should be permanently stored there). Instead, for example in response to obtained information indicating that one compartment of the plurality of compartments has been closed or that at least one shipment from or for the person has been placed in one compartment of the plurality of compartments and the compartment has been closed, the control unit can instruct a lock control unit of this compartment to store the first identifier. The identifier of the lock control unit required for this purpose may be obtained in this case together with the above-mentioned information, for example. It is then obviously not necessary to centrally store the first identifier in the control unit itself.

Exemplary embodiments of the invention may nevertheless provide for one or more first identifiers to be stored in a memory of the control unit of the compartment system, in particular in order to ensure that the first identifiers are assigned to respective keys which are needed by the control unit to check access authorization information, for example. However, the first identifiers are not assigned to respective lock control units and/or compartments as a result, for example.

The method according to the second aspect of the invention is carried out, for example, by a lock control unit (or a component thereof) of the compartment system and corresponds, for example, to the method according to the first aspect of the invention which is performed, for example, by the control unit (or a component thereof).

It is initially detected, at a lock control unit, that the compartment assigned to the lock control unit has been closed or that at least one shipment from or for a person has been placed in the compartment and the compartment has been closed. This can be carried out, for example, using one or more sensors which are either part of the lock control unit or are communicatively connected to the latter.

If it has been detected that the compartment has been closed or that at least one shipment from or for a person has been placed in the compartment and the compartment has been closed, at least one piece of information identifying the lock control unit is transmitted to the control unit. This can then be simultaneously interpreted by the control unit, for example, as an indicator of the fact that the compartment assigned to the lock control unit has been closed or that at least one shipment from or for a person has been placed in the compartment assigned to the lock control unit and the compartment has been closed. Alternatively, a piece of information indicating that it has been detected that the compartment has been closed or that at least one shipment from or for a person has been placed in the compartment and the compartment has been closed may also be additionally (explicitly) transmitted to the control unit.

The first identifier is then obtained from the control unit and stored in the lock control unit.

The method according to the second aspect of the invention also reflects, on the one hand, the possibility of dynamically allocating compartments to persons using the first identifiers and the decentralized retention of information in the lock control units.

A compartment system as described above according to the first and second aspects of the invention may be in the form of a parcel compartment system or a combined mail and parcel compartment system in an apartment building, for example. The persons in a respective household in the apartment building are then each assigned a first identifier, for example. The compartment system may then have fewer parcel compartments than households, for example. Nevertheless, a mail compartment may be provided in the compartment system for each household in the apartment building, for example. The mail compartments may be statically assigned in this case, for example, to the respective first identifiers (and therefore to the households), whereas the parcel compartments are dynamically allocated to the first identifiers (and therefore to the households). This is explained in yet more detail below.

Further advantages of the exemplary aspects of the invention are described below using exemplary embodiments, the disclosure of which is likewise intended to apply to all four aspects of the invention, however.

In one exemplary embodiment of all aspects of the invention, at a time at which the information indicating that the compartment has been closed or that at least one shipment from or for a person has been placed in the compartment and the compartment has been closed is obtained, no identifier associated with a person is stored in the lock control unit assigned to the compartment. The fact that no identifier associated with a person is stored in the lock control unit indicates, for example, that the compartment was not yet occupied.

In one exemplary embodiment of the first aspect of the invention, the method further comprises causing that, before obtaining the information indicating that one compartment of the plurality of compartments has been closed or that at least one shipment from or for a person has been placed in the compartment and the compartment has been closed, at least this compartment is open. Before a delivery agent or the person associated with the first identifier (that is to say, for example, a registered user of the compartment system) can place a shipment in a compartment of the compartment system and can close the compartment, at least this compartment must have been opened. For example, all compartments of the compartment system are fundamentally closed and only one compartment or a few compartments (for example one compartment of each available size of compartment) is/are opened if a delivery agent or the person associated with the first identifier at least implicitly expresses an intention to the control unit (for example by presenting the first identifier to the control unit and/or by interacting with a user interface of the compartment system) of wanting to place at least one shipment. Alternatively, however, it would also be conceivable for unoccupied compartments of the compartment system to be fundamentally open, and it would then be possible to dispense with causing the situation in which at least one compartment is open.

In one exemplary embodiment of the first aspect of the invention, the method further comprises causing opening of at least one other compartment after obtaining the information indicating that one compartment of the plurality of compartments has been closed or that at least one shipment from or for a person has been placed in the compartment and the compartment has been closed and/or after the storing of the first identifier in the lock control unit assigned to the compartment has been caused, wherein no identifier associated with a person is stored in the lock control unit assigned to the other compartment. Opening the other compartment ensures, for example, that further shipments can be placed in the compartment system without significant delays.

In one exemplary embodiment of the first aspect of the invention, the compartments of the plurality of compartments have at least two different sizes, and the method further comprises causing that, before obtaining the information indicating that one compartment of the plurality of compartments has been closed or that at least one shipment from or for a person has been placed in the compartment and the compartment has been closed, at least one compartment of each size is open. Since the compartment system is fundamentally not aware of the size of shipments which are intended to be placed in a compartment of the compartment system, it is advantageous to open one compartment of each size in each case. The delivery agent or the person associated with the first identifier can then him/herself choose which of the compartments is most suitable in terms of size, can place one or more shipments in this compartment (or in a plurality of compartments) and can close the compartment (or the compartments).

The method according to the first aspect of the invention may further comprise in this case, for example: obtaining, in response to a request, respective information from lock control units respectively assigned to one or more compartments of each size indicating that no identifier associated with a person is stored in these lock control units, selecting at least one compartment of each size from the one or more compartments of each size, from the lock control units of which the respective information has been obtained, and causing that, before obtaining the information indicating that one compartment of the plurality of compartments has been closed or that at least one shipment from or for a person has been placed in the compartment and the compartment has been closed, the selected compartments are open. For example, the control unit therefore queries the occupancy status of respective lock control units of one or more compartments of each size, selects at least one compartment of each size from the unoccupied compartments and causes the opening of these compartments.

Provision may then be additionally made, for example, for causing opening of at least one other compartment which has the same size as that compartment for which the information was obtained indicating that it has been closed or that at least one shipment from or for a person has been placed in the compartment and the compartment has been closed, wherein said causing takes place after obtaining the information indicating that one compartment of the plurality of compartments has been closed or that at least one shipment from or for a person has been placed in the compartment and the compartment has been closed and/or after the storing of the first identifier in the lock control unit assigned to the compartment has been caused, and wherein no identifier associated with a person is stored in the lock control unit assigned to the other compartment. This advantageously ensures that, after placing a shipment in a compartment, a compartment of the same size is immediately open for the purpose of placing a further shipment.

Whereas the embodiments described above primarily related to the placing of shipments in compartments of the compartment system—either by the delivery agent or by the person associated with the first identifier, an embodiment which additionally integrates a process of collecting shipments already in the compartment system is now described.

In one exemplary embodiment of the first aspect of the invention, the method further comprises: causing opening of one or more compartments, the respectively assigned lock control units of which store a piece of information indicating that they contain at least one shipment for collection and/or an identifier associated with a person, and causing, for the lock control units of the one or more compartments, the deleting of the information indicating that they contain at least one shipment for collection and/or the identifier associated with a person.

For example, if a person places a shipment in a compartment of the compartment system for collection by the delivery agent, a piece of information indicating that the compartment contains a shipment for collection may be stored in the lock control unit assigned to the compartment, for example in the form of a set bit or flag. This may be carried out, for example, in addition to storing the first identifier associated with the person in the lock control unit since it may be necessary to distinguish which placed shipments are intended to be collected by the delivery agent and which are only waiting for the removal by other persons (recipients of the shipments).

If the delivery agent collects shipments from the compartment system, the control unit, for example, then causes the situation in which those compartments which contain the information indicating that they contain at least one shipment for collection are opened, for example at the same time or sequentially (for example, a new compartment is opened in each case when the delivery agent has closed a previously open compartment again—after removing and processing the shipment to be collected). In this case, the control unit transmits the command, for example, that each lock control unit which has stored the information indicating that its compartment contains at least one shipment for collection is intended to open its assigned compartment.

Furthermore, the situation is caused in which the information indicating that a compartment assigned to a lock control unit contains at least one shipment for collection is deleted from the lock control unit again, just like the first identifier stored in the lock control unit, in order to illustrate that the compartment is now free again.

In this case, the causing of the opening and the causing of the deleting can be carried out, for example, after the obtaining of the first identifier and before the obtaining of the information indicating that one compartment of the plurality of compartments has been closed or that at least one shipment from or for the person has been placed in one compartment of the plurality of compartments and the compartment has been closed. This is advantageous since the obtaining of the first identifier at the control unit can be interpreted as authentication (and authorization) of the delivery agent with respect to the compartment system and should therefore come before the process of collecting shipments from the compartment system. For example, the process of obtaining the first identifier (as explained in yet more detail below) comprises checking the authenticity and/or integrity of a piece of access authorization information which contains the first identifier, and the method according to the first aspect of the invention is aborted, for example, if the check of the authenticity and/or integrity of the access authorization information is not successful. The process of collecting shipments from the compartment system also advantageously takes place before the process of placing shipments in the compartment system in order to avoid capacity bottlenecks occurring in the compartment system. The compartments are therefore first emptied as far as possible by removing shipments to be collected and are then filled again with shipments to be placed.

In one exemplary embodiment of the first aspect of the invention, the method further comprises causing storing of a piece of information indicating that the compartment contains at least one shipment for collection in the lock control unit assigned to the compartment. As already explained above, this forms the basis for the compartment system or a delivery agent being able to identify compartments containing shipments to be collected.

Since exemplary embodiments have already described the placing of shipments in the compartment system by the delivery agent or by persons associated with the first identifier and the collecting of shipments from the compartment system by the delivery agent, some exemplary embodiments which relate to the removing of shipments placed by the delivery agent by the recipient of the shipment are now described. The recipients of the shipments are persons associated with a second identifier. The term "second identifier" is used in this case to distinguish between the two identifiers obtained at the control unit (the "first identifier" during placement and the "second identifier" during removal). It goes without saying that, if the two identifiers obtained relate to the same at least one placed/removed shipment, the first identifier and the second identifier are identical and are associated with the same person.

In one exemplary embodiment of the first aspect of the invention, the method further comprises obtaining a second identifier, which is associated with at least one person and either matches the first identifier or differs from the latter, at the control unit, and causing opening of one or more compartments, in the respectively assigned lock control units of which the second identifier is stored, and causing deleting of the second identifier from one or more of the lock control units assigned to the one or more compartments.

In this case, the second identifier can be obtained, for example, in the manner already described above with respect to the obtaining of the first identifier. In particular, the second identifier can be stored on an NFC tag, an RFID tag or on a portable electronic communication device, in particular a mobile telephone, belonging to a person associated with the second identifier, and can then be transmitted to the control unit of the compartment system using NFC, RFID or Bluetooth, for example.

A compartment is opened, for example, by virtue of the control unit transmitting a control command that each lock control unit which stores the second identifier is intended to unlock the lock respectively assigned to it During this unlocking process, a door of the respective compartment may also be pushed open, for example, if, during the previous process of closing the door—for example by tensioning a spring—a prestress for pushing open the door was built up.

The respective lock control unit can then also automatically delete the second identifier, for example. Alternatively, an explicit control command from the control unit is required for this purpose, which control command is transmitted by the control unit, for example, when the latter obtains a piece of information from the lock control unit indicating that the compartment has been closed.

Whether the second identifier is actually deleted from the respective lock control unit may depend, for example, on the type of compartment involved.

In one exemplary embodiment of the first aspect of the invention, at least one compartment of the one or more compartments, from the assigned lock control units of which the second identifier is deleted, is a parcel compartment.

For mail compartments, the second identifier may not be deleted, for example, after the compartment has been opened, for example because a respective second identifier is statically allocated to the mail compartments. This is explained below with reference to a third identifier which is obtained at the control unit and—in a similar manner to the second identifier—can match the first identifier and is referred to as a "third identifier" only for the purposes of distinction.

In one exemplary embodiment of the first aspect of the invention, the method further comprises: obtaining a third identifier, which is associated with at least one person and either matches the first identifier or differs from the latter, at the control unit, wherein at least one compartment for a plurality of placement and/or collection processes is statically allocated, rather than respectively dynamically allocated, to the third identifier by storing the third identifier for the plurality of placement and/or collection processes in the lock control unit assigned to this compartment, and causing opening of this compartment.

In this case, the third identifier is not deleted from the lock control unit assigned to this compartment, for example, and/or no deletion of the third identifier from the lock control unit assigned to this compartment is caused.

The compartment which is statically allocated to the third identifier for a plurality of placement and/or collection processes may be a mail compartment, for example. The compartment, in the assigned lock control unit of which the first identifier is stored, may be, in contrast, a parcel compartment, for example. Nevertheless, the first identifier and the third identifier may be identical, that is to say the same identifier is then assigned to both a parcel compartment (as the "first identifier") and to a mail compartment (as the "third identifier"). The "second identifier" can also match these two identifiers, in which case the "second identifier" is then likewise assigned to the parcel compartment.

In one exemplary embodiment of all aspects of the invention, the lock control units communicate with the control unit via a bus, in particular a CAN bus, for example according to ISO 11898. During communication, data and/or remote frames are used, for example, to transmit data to other bus subscribers or to request data from the latter.

Alternatively, it is possible to use, for example, a bus (for example the interlock data bus (ILDB) described in more detail below) in which the communication protocol is formed by means of (or on the basis of) UART (Universal Asynchronous Receiver Transmitter, that is to say the data are transmitted, for example, in 8-bit packets (that is to say packets containing eight data bits) each additionally comprising a start bit, a parity bit and a stop bit) and/or in which collision detection takes place and not only collision avoidance or collision resolution (for example in the case of the CAN bus). This bus may use, for example, the bus driver concept of the CAN bus and/or a CAN bus transceiver. The electrical levels on the bus can then correspond, for example, to the electrical levels in the CAN bus, while the bit timing and/or the bus arbitration differ(s) from the CAN bus. For example, operation is carried out using the bit sequence of the UART, rather than the conventional bit sequence of the CAN bus. For example, in the case of this bus, one or more (for example all) bus subscribers (that is to say the lock control units) take one or more bus arbitration measures. One of the measures may comprise, for example, bus subscribers waiting for a period of time, after detecting that the bus is free, before starting to transmit data on the bus, in which case the period of time is individually determined for each bus subscriber. The respective period of time may be determined, for example, from an identifier of the respective bus subscriber according to a predetermined calculation rule (for example from a predetermined number of bits in the identifier). One of the measures may comprise, for example, each bus subscriber transmitting, at the start of its data to be transmitted, a symbol (for example one byte) which is individually intended for each bus subscriber and is determined, for example, from an identifier of the respective bus subscriber according to a predetermined rule (for example by means of bit shifts from a predetermined number of bits in the identifier). The symbol may be used to detect collisions on the bus in very good time. The symbol may further be such that conclusions with respect to the identifier of the transmitting bus subscriber are possible for other bus subscribers. This can be used to follow a rule stating that, in the event of a collision, only the bus subscriber with the lower (or higher) identifier can continue to transmit and bus subscribers with higher (or lower) identifiers must abort their transmission attempt. One of the measures may provide for each bus subscriber to further transmit its identifier in the data to be transmitted, for example after the symbol described above. Whereas the symbol and/or the period of time may be the same for at least two bus subscribers, the respective identifier is different for all bus subscribers and may therefore be used to follow a rule stating that, in the event of a collision, only the bus subscriber with the lower (or higher) identifier can continue to transmit and bus subscribers with higher (or lower) identifiers must abort their transmission attempt.

In this case, the messages (for example commands) transmitted via the bus can be received in each case by all bus subscribers, for example. However, only one bus subscriber or a subset of bus subscribers, for example, then performs an action in response to the message, for example when the message contains an identifier of this bus subscriber or this subset of bus subscribers or when the bus subscriber or the subset of bus subscribers satisfies one or more criteria included in the message.

In one exemplary embodiment of all aspects of the invention, further lock control units can be connected to the bus for the purpose of communication with the control unit without the need for any changes to the control unit with regard to the communication (and/or with regard to these further lock control units in general). This may be based, for example, on the fact that, during communication between the control unit and the lock control units, the control unit transmits only commands which contain a criterion which the receivers (lock control units) must check and must carry out corresponding actions (that is to say, for example, checking whether a particular bit or flag is set in the receiver and carrying out particular actions on the basis thereof) without the need, for example, for individual addressing or identification of receivers (lock control units) (for example, if the commands are received by all receivers (lock control units) connected to the bus, one or more actions take place, on the basis of the content of the commands, only at those one or more receivers (lock control units) to which the content relates), or on the fact that the control unit (for example likewise in a message received by all receivers (lock control units) connected to the bus) first of all queries properties of the receivers (lock control units) and this results in feedback from all or some receivers (lock control units) to the control unit, the feedback containing at least one respective identification of the receivers (lock control units), and the control unit then using the reported identification of the receivers (lock control units) either to address (for example directly) further commands to some or all of the receivers which have transmitted feedback or embeds this identification in further commands which are received by all receivers (lock control units) connected to the bus so that it is possible to discern, on the basis of the embedded identification of one or more of the receivers (lock control units), that they are specifically addressed and therefore perform one or more actions.

Alternatively, communication between the control unit and the lock control units can be carried out (for example in a wired or wireless manner) in such a manner that one or more lock control units or the control unit is/are specifically addressed during communication and only these specific addressees receive and evaluate the respective message.

In one exemplary embodiment of all aspects of the invention, the compartment system is part of a delivery and/or collection system comprising a plurality of delivery and/or collection containers associated with respective identifiers and a central unit for providing access authorizations associated with the respective identifiers for the delivery and/or collection containers, wherein the format of the first identifier corresponds to the format of the identifiers associated with the delivery and/or collection containers, and wherein by storing the first identifier in a lock control unit of the compartment system, the compartment assigned to the lock control unit can be handled from the point of view of the central unit like an individual delivery and/or collection container with regard to the access authorizations.

The delivery and/or collection containers may be parcel boxes, for example, each associated with a lock identifier (LockID). Further examples of delivery and/or collection containers are the parcel butler, garden sheds, garages and trunks and/or interiors of vehicles each provided with electronic locks, with the result that they can at least be unlocked by an accordingly authorized delivery agent. The delivery and/or collection system may provide, for example, access authorizations which contain this lock identifier as the access authorization parameter and are therefore only valid for the respective delivery and/or collection container. The lock identifier is also associated here with a respective person via the personal delivery and/or collection container.

The generation and use of the access authorizations tied to the lock identifier can be applied to the compartment system by virtue of the lock identifier being directly associated with a person, rather than being permanently allocated to a lock control unit (of a parcel compartment) (as would be the case with the delivery and/or collection containers). This makes it possible to efficiently dynamically allocate a parcel compartment of the compartment system to the person without having to change the structure and generation of the access authorizations. The lock identifier is therefore "virtualized" as it were for the parcel compartments of the compartment system. From the point of view of the central unit for providing the access authorizations, there are then consistently only lock identifiers to which the access authorizations are linked. In the case of the delivery and/or collection containers, these lock identifiers are real, that is to say are statically assigned to a delivery and/or collection container or its lock, whereas, in the case of the compartment system, the lock identifier is virtual with respect to the parcel compartments and its assignment to specific compartments/lock control units dynamically changes. In contrast, in the case of the mail compartments of the compartment system, lock identifiers are statically assigned to mail compartments in a similar manner to that in the case of the delivery and/or collection containers.

In one exemplary embodiment of all aspects of the invention, the first identifier is included in access authorization information, which comprises one or more access authorization parameters including the first identifier, and whose authenticity and/or integrity can be checked using a key stored in the control unit. Further access authorization parameters define, for example, a period of time during which the access authorization information authorizes access, or define what type of access (for example only a mail compartment, only a parcel compartment, or a mail and parcel compartment) is allowed. The check of the authenticity and/or integrity is based, for example, on a piece of checking information (for example a Message Authentication Code, MAC) which is included in the access authorization information, has been generated by applying cryptographic operations to at least some (or all) of the access authorization parameters using a first key and can be double-checked using a second key which forms a symmetrical or asymmetrical key pair with the first key. If the check is positive, the integrity (intactness) of the obtained access authorization parameters and of the obtained checking information is ensured. If the first key is additionally present only at a trusted source, it can be assumed, if the check is successful, that the access authorization parameters and the obtained checking information come from the trusted source.

For example, for a plurality of different instances of the first identifier, which are obtainable at the control unit and are respectively associated with different persons, respectively associated different keys are then stored in the control unit.

The access authorization information containing the first identifier is provided, for example, by a delivery agent wishing to place at least one shipment for the person associated with the first identifier into the compartment system, or is provided by the person who is associated with the first identifier and wishes to place at least one shipment for collection by a delivery agent into the compartment system, or is provided by a device belonging to the delivery agent or to the person.

The authenticity and/or integrity of the access authorization information is/are checked, for example, and the method is aborted, for example, in case of lack of authenticity and/or integrity.

The above-described exemplary embodiments and exemplary configurations of all aspects of the present invention are also intended to be understood as having been disclosed in all combinations with one another.

Further advantageous exemplary configurations of the invention can be gathered from the following detailed description of some exemplary embodiments of the present invention, in particular in conjunction with the figures. However, the figures accompanying the application are intended to be used only for the purpose of illustrating the invention, but not for determining the scope of protection of the invention. The accompanying drawings are not necessarily true to scale and are intended to reflect only the general concept of the present invention by way of example. In particular, features which are included in the figures are not intended to be considered in any way to be a necessary part of the present invention.

DETAILED DESCRIPTION OF SOME EXEMPLARY EMBODIMENTS OF THE INVENTION

Figure 1:
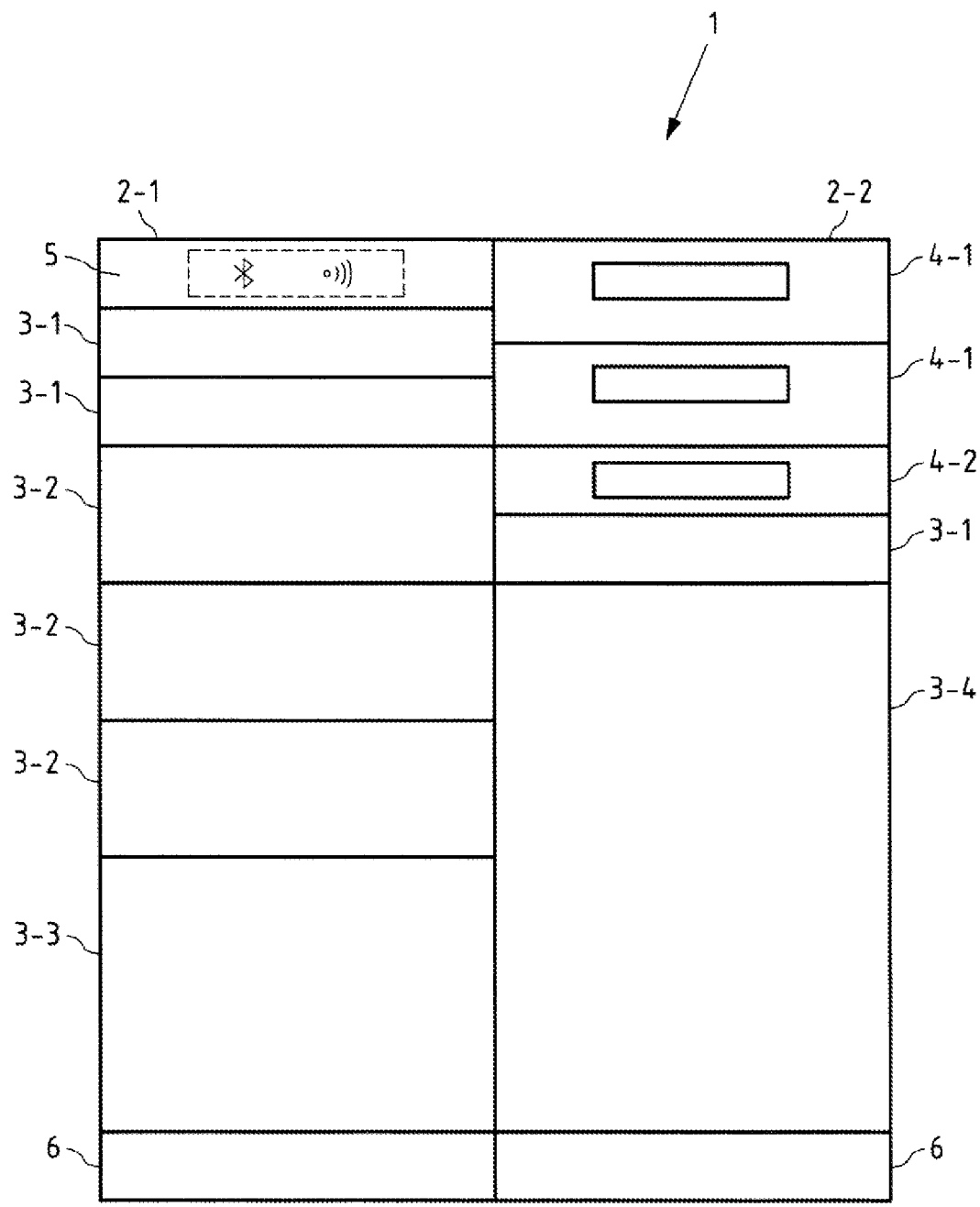
FIG. 1 shows a schematic front view of an exemplary embodiment of a compartment system according to the present invention.

Exemplary embodiments of the present invention relate to compartment systems, in particular parcel compartment systems or combined mail and parcel compartment systems, in particular for use in apartment buildings. For example, a user of the compartment system, who may be a resident of the apartment building for example, can be dynamically allocated a parcel compartment for the purpose of delivering shipments and/or for having shipments collected (returns). However, the user can additionally be statically allocated a mail compartment. The shipments may be, for example, small packages or parcels containing goods ordered from a supplier or returned to the latter, or objects (for example presents) sent between private individuals, or food deliveries (for example from a discount store or a pizza delivery service), to name just a few examples.

The access authorization needed to open the parcel compartment and the mail compartment may be stored in this case in a combined manner on an electronic device, for example a mobile telephone or an NFC or RFID tag belonging to the user, and may be transmittable to the compartment system. Accordingly, a delivery agent also has corresponding access authorization information, at least for the purpose of opening the parcel compartment. This information may be stored, for example, on an electronic device belonging to the delivery agent, for example a handheld scanner which is configured to scan codes (for example barcodes or QR codes) affixed to shipments in order to capture the data associated with the shipment, and can be wirelessly (for example by means of NFC or RFID, or optically) transmittable to the compartment system from said device.

Such a compartment system makes it possible, for example, to assign a particular number of parcel compartments to an independent number of users. For this purpose, it is necessary to assign the parcel compartments or the locks of the parcel compartments to a particular person (the user) for a particular period. After the shipment has been removed, whether by the user or the delivery agent, the parcel compartment is available again for other users.

In order to enable this operation, the compartment system contains a definable number of compartments in various sizes, for example. The number of compartments is selectable independently of the number of users, for example, and is smaller than the number of users, for example. In the basic state, there is no relationship between the compartments and the users, for example. A relationship between the compartment and the user is established only when a shipment is stored, whether by the delivery agent or the user, only for the duration of the storage, for example. This relationship is canceled again following removal, for example.

In order to increase the flexibility, four different compartment sizes for shipments and a mail compartment, for example, are available for selection in the compartment system. These compartments can be combined in different variants, for example. It may likewise be possible to change the compartment configuration after the compartment system has been delivered in order to adapt the compartment system to the local delivery behavior of the users.

FIG. 1 shows a front view of an exemplary embodiment of a compartment system 1 according to the present invention. The compartment system has two modules 2-1 and 2-2 which are installed beside one another on respective bases 6 and are connected to one another. The first module 2-1 has a plurality of parcel compartments of different sizes 3-1, 3-2 and 3-3 which are arranged above one another. Each parcel compartment 3-1, 3-2, 3-3 is provided, on its front side, with a respective door which is hinged at the side, for example, and can be opened to the front when the lock (not illustrated) assigned to the respective door has been unlocked. Alternatively, it is also possible to use flaps, for example, which are each hinged at the upper or lower horizontal edge of a compartment, for example, and can then be swung open or folded down when the lock has been unlocked. Each parcel compartment 3-1, 3-2, 3-3 therefore forms a closable receiving space for shipments.

The first module 2-1 further contains a plug-in unit 5 containing a control unit of the compartment system 1, as is explained in more detail below using FIG. 2.

The first module 2-1 already fundamentally represents a complete compartment system 1. However, this system can be flexibly extended by means of further modules. In this respect, FIG. 1 illustrates, by way of example, a further module 2-2 which comprises both parcel compartments 3-1, 3-4 and mail compartments of different sizes 4-1, 4-2. It goes without saying that the module 2-2 could also have only parcel compartments or only mail compartments and the module 2-1 could then also have one or more mail compartments in addition to the parcel compartments. Like the parcel compartments, the mail compartments 4-1, 4-2 have, for example, a door or flap in which, in contrast to the parcel compartments however, a mail slot has been made, which mail slot can be provided with a movable cover flap. It is therefore possible for a delivery agent to insert letters into the mail compartment without presenting access authorization information for the mail compartment. For removal, the user (recipient) uses his/her access authorization information to open the door or flap.

Figure 3:
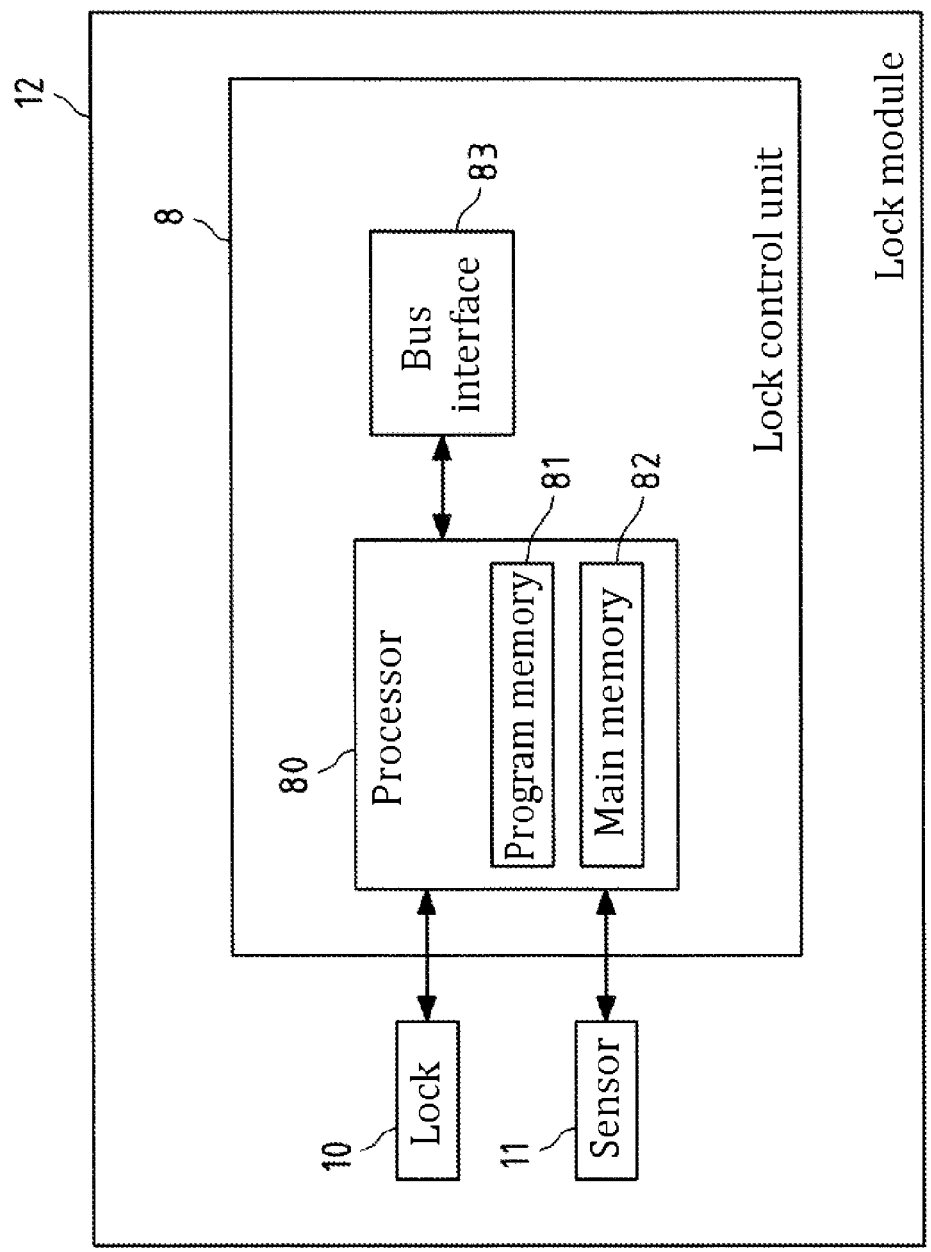
FIG. 3 shows a schematic illustration of an exemplary embodiment of a lock control unit according to the present invention.

As explained, the parcel compartments 3-1, 3-2, 3-3, 3-4 and mail compartments 4-1, 4-2 of the compartment system each have a lock which is controlled by a respective lock control unit (cf. FIG. 3). The lock and lock control unit may also be respectively combined in a lock module. The lock control units are configured to communicate with the control unit, which can be carried out in a wireless or wired manner, for example. For example, communication takes place via a bus, in particular a CAN bus or the ILDB described below, to which the control unit and the lock control units are connected. If the lock control units of a module 2-1, 2-2 are each arranged on the same side wall of the compartments of the module 2-1, 2-2 (for example on the right-hand side wall of a compartment in each case (inside or outside the compartment)), for example, the bus line to which all lock control units are connected may also advantageously run on this side of the module 2-1, 2-2. The bus lines each running on the side of a module 2-1, 2-2 can then be connected to a vertically running bus line, for example, which is also connected to the control unit.

It would fundamentally be conceivable to use passive locks for the compartment system 1. However, such a passive lock concept presupposes central control of each module 2-1, 2-2 by means of a module controller. However, such a compartment system requires increased expenditure on cabling and entails a certain degree of inflexibility inside a module 2-1, 2-2. The data connection of the module controllers by means of a CAN network and the connection of the passive locks to the module controllers also require increased expenditure in terms of the electronics and the cabling. A further disadvantageous aspect is the increased power consumption since a very large number of control systems (central controller and module controller) must be permanently supplied with power in this case.

The expenditure on material and the power consumption may play a certain role in the compartment system 1 according to exemplary embodiments of the invention. It may be additionally desirable to enable compartment configuration in the field without intervening in the control system of the compartment system 1. Therefore, instead of a purely passive lock which may consist, for example, of an electromagnet and two sensors, an active lock variant with bus capability is selected according to exemplary embodiments of the invention.

Figure 2:
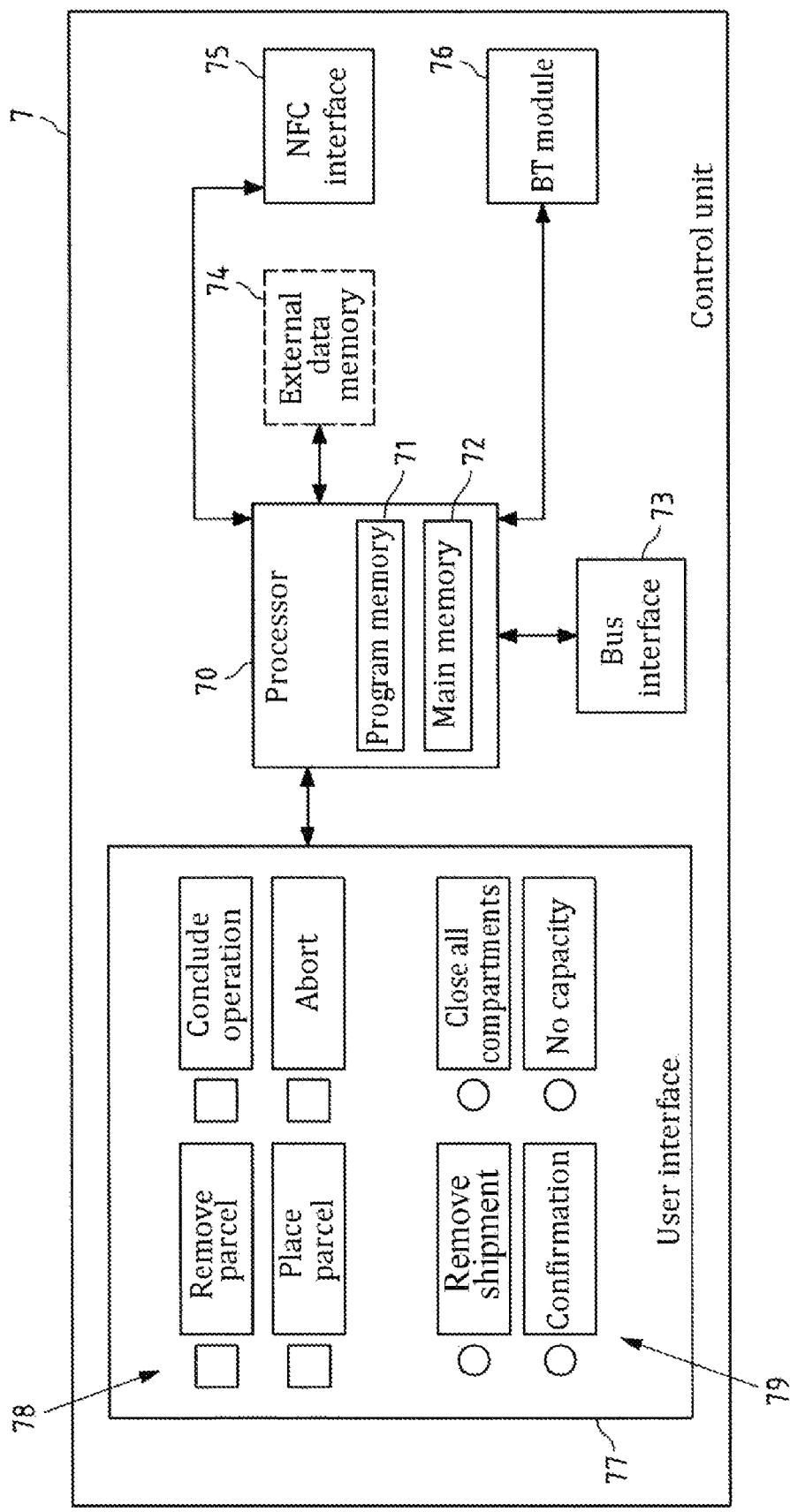
FIG. 2 shows a schematic illustration of an exemplary embodiment of a control unit according to the present invention.

FIG. 2 is a schematic illustration of an exemplary embodiment of a control unit 7 according to the present invention, as may be included, for example, in the plug-in unit 5 of the compartment system 1 in FIG. 1. One or more control units of this type may be present in a compartment system 1, the lock control units each controlled by the control units forming disjoint groups, for example.

The control unit 7 comprises a processor 70 which, for example, performs a program stored in the program memory 71 and uses main memory 72 in the process. Program memory 71 may also store further data, for example the data illustrated in FIG. 4. Alternatively, a further memory in the processor 70 and/or an optional external memory 74 is/are provided for this purpose. Program memory 71 may be, for example, a persistent memory, for example a read-only memory (ROM). It may be in the form of a flash memory, for example. The program memory 71 may be permanently connected to the processor 70, for example, but may alternatively also be releasably connected to the processor 70, for example as a memory card, a floppy disk or an optical data storage medium (for example a CD or DVD). Processor 70 may be, for example, in the form of a microprocessor or a DSP (digital signal processor) or ASIC (application-specific integrated circuit), to name just a few examples.

Processor 70 and the control unit 7 are examples of an apparatus according to the first aspect of the invention, that is to say are configured to perform and/or control the method according to the first aspect of the invention (as will be described, by way of example, using the flowcharts 500, 600, 700 and 800 in FIGS. 5-8), comprise respective means for performing and/or controlling the steps of this method, or comprise at least one processor 70 and at least one memory 71 which contains program code, the memory 71 and the program code being configured to cause the apparatus having the at least one processor 70 to perform and/or control at least the method according to the first aspect of the invention, the method comprising: obtaining a first identifier (referred to as LockID below), which is associated with at least one person (for example a user of the compartment system), at a control unit of a compartment system which, in addition to the control unit, has a plurality of compartments provided with respective locks and lock control units which are respectively assigned to the compartments and are configured to communicate with the control unit, obtaining information indicating that one compartment of the plurality of compartments has been closed or that at least one shipment from or for the person has been placed in one compartment of the plurality of compartments and the compartment has been closed, and causing the storing of the first identifier in the lock control unit assigned to the compartment.

The program memory 72 is likewise a computer-readable storage medium on which a computer program according to the first aspect of the invention is stored.

The control unit 7 further comprises an NFC interface 75 and a Bluetooth module 76. The Bluetooth module 76 is used, for example, to obtain access authorization information from an electronic device belonging to a delivery agent or user of the compartment system via the Bluetooth protocol. The NFC interface 75 comprises, for example, an NFC reader in order to read access authorization information from NFC tokens (that is to say portable small objects with integrated NFC chips, for example smartcards or keyrings). For this purpose, NFC interface 75 and Bluetooth module 76 are controlled by the processor 70 and communicate with the latter.

Processor 70 further controls a bus interface 73 (for example a CAN bus transceiver) via which processor 70 can communicate via a bus. The bus interface 73 is connected to the processor 70 via a Universal Asynchronous Receiver Transmitter (UART) interface, for example. The bus interface 73 is physically connected to the bus via a connector (for example a multi-pole connector), for example.

The bus may be, for example, a serial bus, for example a CAN bus or an ILDB. The lock control units to be controlled by the control unit 7 are likewise connected to the bus. In embodiments of the invention, the use of the bus and the special communication technology of the control unit already explained above make it possible for the compartment system 1 to be extended with further modules 2-1, 2-2 having parcel and/or mail compartments without the need for any changes to the control unit. As an alternative to the CAN bus, the interlock data bus (ILDB) described in yet more detail further below can be used, for example.

The processor 70 further controls a user interface 79 of the control unit 7, which user interface has a button field 78 having buttons which are actuatable by the delivery agent and/or user and a display field 77 for displaying information for the delivery agent and/or user. The button field 78 contains, for example, the buttons "Remove parcel", "Place parcel", "Conclude operation" and "Abort". The buttons are in the form of pushbuttons here, by way of example. The display field 77 contains display elements "Remove shipment", "Confirmation", "Close all compartments" and "No capacity". The display elements are, for example, in the form of illuminated display elements here, for example LEDs. Alternatively, the user interface 79 may also be in the form of a touch-sensitive user interface, that is to say a touchscreen for example, the buttons then being only graphically represented and being actuated via the touchscreen and the display elements also being only graphically represented and not being present as respectively separate display elements.

The control unit 7 may be connected to an energy supply, for example the conventional power supply system. The control unit 7 can then also supply the lock control units with energy, for example by means of wiring which is laid together with the bus line or is integrated in the latter.

FIG. 3 is a schematic illustration of an exemplary embodiment of a lock control unit 8 according to the present invention. Such a lock control unit 8 is assigned (for example also spatially), for example, to each lock 10 of a parcel compartment or mail compartment of the compartment system 1 (FIG. 1). Such a lock 10 is schematically illustrated in FIG. 3. It may be, for example, a lock which retracts or extends a bolt or which receives a hook (for example fastened to a door or flap) and locks or unlocks the latter. One example of a lock of the last-mentioned type is described in the German patent application DE 10 2013 111 226 A1 by the applicant.

The lock 10 may be an electrically actuatable lock, for example. The bolt or a locking element interacting with a hook is moved, for example, by an electromagnet or an electric motor. The electromagnet or electric motor of the lock 10 is then controlled by the lock control unit 8, for example via an I/O port of the processor 80 of the lock control unit 8, which controls an interface to the lock 10 via a driver. The lock control unit 8 is at least configured, for example, to cause unlocking of the locked lock 10. Locking of the unlocked lock 10 can additionally also be caused, for example. However, the latter may be unnecessary when the lock 10 has a latch function and locking takes place automatically, for example, as a result of the closing of the door of the compartment. Optionally, the locking functionality of the lock 10 can also be deactivatable and/or activatable, for example by means of corresponding control commands from the lock control unit 8. For example, a latch function of the lock 10 may constitute such a locking functionality. The locking function can be deactivated, for example, by maintaining the state assumed by the lock in the unlocking state, for example by maintaining a locking element in a release position. Alternatively, the locking function can be deactivated by virtue of the lock control unit 8 (or the control unit 7) respectively unlocking the lock 10 again, in a period in which the locking function is intended to be deactivated, if locking is detected (for example as a result of triggering of a latch function), by transmitting a control command, for example immediately when locking is detected. The locking is therefore at least briefly mechanically possible, but is canceled again each time by the control command, with the result that the locking function is effectively electronically deactivated.

One exemplary embodiment of a lock 10 comprises an electromechanical solenoid which actuates an unlocking lever via a plunger. The unlocking lever is spring-loaded, with the result that, upon closing of the door or flap, the unlocking lever automatically latches and the locking therefore requires a purely mechanical process. In order to detect whether the lock is closed and locked, the lock has two sensors, for example. One of the two sensors reports the position of the unlocking lever. The second sensor detects the position of a spring-loaded ejector which is pressed inward when the door is closed. The compartment is considered to be closed, for example, only when both sensors report the closed and locked state. The sensor system is created on a magnetic basis, for example for reasons of reliability, durability and resistance to environmental influences (dust, temperature, sunlight). For this purpose, two permanent magnets, for example, are situated on the moving parts (ejector and unlocking lever). The magnetic field of these two permanent magnets is evaluated, for example, using two Hall sensors which are fitted on a printed circuit board.

In order to eliminate the need for a module controller in each module 2-1, 2-2 and to enable a simpler structure of the cabinet cabling in embodiments of the compartment system according to the invention, the lock module 12 of each compartment is equipped with a certain amount of intelligence by means of the lock control unit 8. This intelligence is intended to make it possible to connect all lock modules 12 of the compartment system 1 to a serial data bus and therefore to be able to make the wiring complexity more flexible and more cost-effective. The connection of all lock modules 12 to a common data bus presupposes, for example, that each lock module 12 has its own address or ID. The slave (lock module 10 or lock control unit 8) can be selectively addressed by the master (of the control unit 7 or the processor 70) using this ID. For this purpose, the electronics of the lock modules 12 comprise the processor 80 described in yet more detail below, for example a microcontroller, for example having an oscillator. This processor 80 contains the data communication protocol for the bus connection and the lock logic for controlling and monitoring the actuator (in the lock 10) and the sensors 11. The power supply used is, for example, a 24 V DC network which is connected in a bus system together with the data lines, for example. All lock modules 12, for example, are supplied with direct current via this supply network. This supply network can be centrally disconnected by the master, for example, in order to minimize the power consumption of the compartment system 1. This measure makes it possible to supply the compartment system 1 using a battery system and therefore to enable a structure of the system which is independent of the power supply system. The lock control unit 8 comprises a processor 80 which, for example, performs a program stored in the program memory 81 and uses main memory 82 in the process. Program memory 81 may also store further data, for example the data illustrated in FIG. 4. Alternatively, a further memory in the processor 80 and/or an optional external memory is/are provided for this purpose. For example, the data illustrated in FIG. 4 may be stored in a non-volatile data memory, for example an emulated EEPROM memory of the processor 80 (in particular if the processor is in the form of a microcontroller). Program memory 81 may be, for example, a persistent memory, for example a read-only memory (ROM). It may be in the form of a flash memory, for example. The program memory 81 may be permanently connected to the processor 80, for example, but may alternatively also be releasably connected to the processor 80, for example as a memory card, a floppy disk or an optical data storage medium (for example a CD or DVD). Processor 80 may be in the form of a microprocessor, for example, or a DSP (digital signal processor) or ASIC (application-specific integrated circuit), to name just a few examples. Main memory 82 may be, for example, in the form of a volatile memory, for example a RAM memory.

Processor 80 and the lock control unit 8 are examples of an apparatus according to the second aspect of the invention, that is to say are configured to perform and/or control the method according to the second aspect of the invention (as will be described, by way of example, using the flowcharts 500, 600, 700 and 800 in FIGS. 5-8), comprise respective means for performing and/or controlling the steps of this method, or comprise at least one processor 80 and at least one memory 81 which contains program code, the memory 81 and the program code being configured to cause the apparatus having the at least one processor 80 to perform and/or control at least the method according to the first aspect of the invention, the method comprising: detecting, at a lock control unit assigned to a compartment of a compartment system comprising a control unit and a plurality of compartments provided with respective locks and lock control units which are assigned to the compartments and are configured to communicate with the control unit, that the compartment has been closed or that at least one shipment from or for a person (for example a user of the compartment system) has been placed in the compartment and the compartment has been closed, transmitting at least one piece of information (referred to as PseudoLockID below) identifying the lock control unit to the control unit if it has been detected that the compartment has been closed or that at least one shipment from or for a person has been placed in the compartment and the compartment has been closed, obtaining a first identifier (referred to as LockID below), which is associated at least with one person, from the control unit, and storing the first identifier in the lock control unit.

The program memory 81 is likewise a computer-readable storage medium on which a computer program according to the second aspect of the invention is stored.

The lock control unit 8 further comprises a bus interface 83 (for example a CAN bus transceiver) via which processor 80 can communicate via a bus. The bus interface 83 is connected to the processor 80 via a Universal Asynchronous Receiver Transmitter (UART) interface, for example. The bus interface 83 is physically connected to the bus via a connector (for example a multi-pole connector), for example. The lock control unit 8 can be supplied with energy, for example, via the bus (for example a 24 V supply in the case of a CAN bus or an ILDB). For this purpose, a DC/DC converter (not illustrated) can be provided in the lock control unit 8, for example, and supplies the processor 8, the bus interface 83 and the sensors 11 with power.

Processor 80 further communicates (for example via an I/O port) with one or more sensors 11 which are either arranged separately from the lock control unit 8 (as illustrated in FIG. 3) or may be at least partially part of the lock control unit 8. The sensor 11 can detect, for example, whether the door of the compartment, to which the lock control unit is assigned, is open or closed. This can be effected, for example, by means of a button which interacts with the door, or can be detected by a sensor 11 integrated in the lock 10. If the lock 10 is configured, for example, to receive a hook fastened to the door or formed on the latter, a sensor 11 (for example a button) in the lock can detect whether the hook has been inserted into the lock. If the insertion of the hook to a predefined degree also automatically results in locking of the hook in the lock (in the sense of a latch function), the sensor 11 can simultaneously detect the closing of the door and the locking of the door. Further optional sensors 11 may be used, for example, to detect whether or not a shipment is in the compartment. This can be carried out optically (for example by means of one or more light barriers), for example, or using weighing sensors, to name just a few examples.

The lock control unit 8, the lock 10 and the one or more sensors 11 may be accommodated together in a lock module 12, in particular in a common housing. Each lock module 12 is then accommodated in a respective separate housing, for example. This lock module 12 may be, for example, respectively laterally arranged on a respective compartment, for example inside or outside the compartment, in order to enable simple connection of the lock modules 12 to the common bus, as already described above.

The lock control unit 8 may be assigned to a parcel compartment or a mail compartment, for example. The only difference can then be, for example, the fact that different data are stored in a memory of the lock control unit 8 in the case of assignment to a mail compartment than in the case of the assignment to a parcel compartment, as is explained in yet more detail below with reference to FIG. 4.

As already explained, respective identifiers, which are referred to as LockIDs below, are assigned to the users of the compartment system 1 in exemplary embodiments of the present invention. However, the term LockID is not intended to give the impression that a LockID would identify a lock 10 or a lock control unit 8 of a compartment. The background of this designation is explained later in the discussion of FIG. 9.

A subsequently used identifier, which actually identifies a respective lock control unit 8, is the PseudoLockID. This is used by the control unit 7 to identify lock control units 8, in particular if the control unit 7 wishes to specifically address a lock control unit 8.

Figure 4:
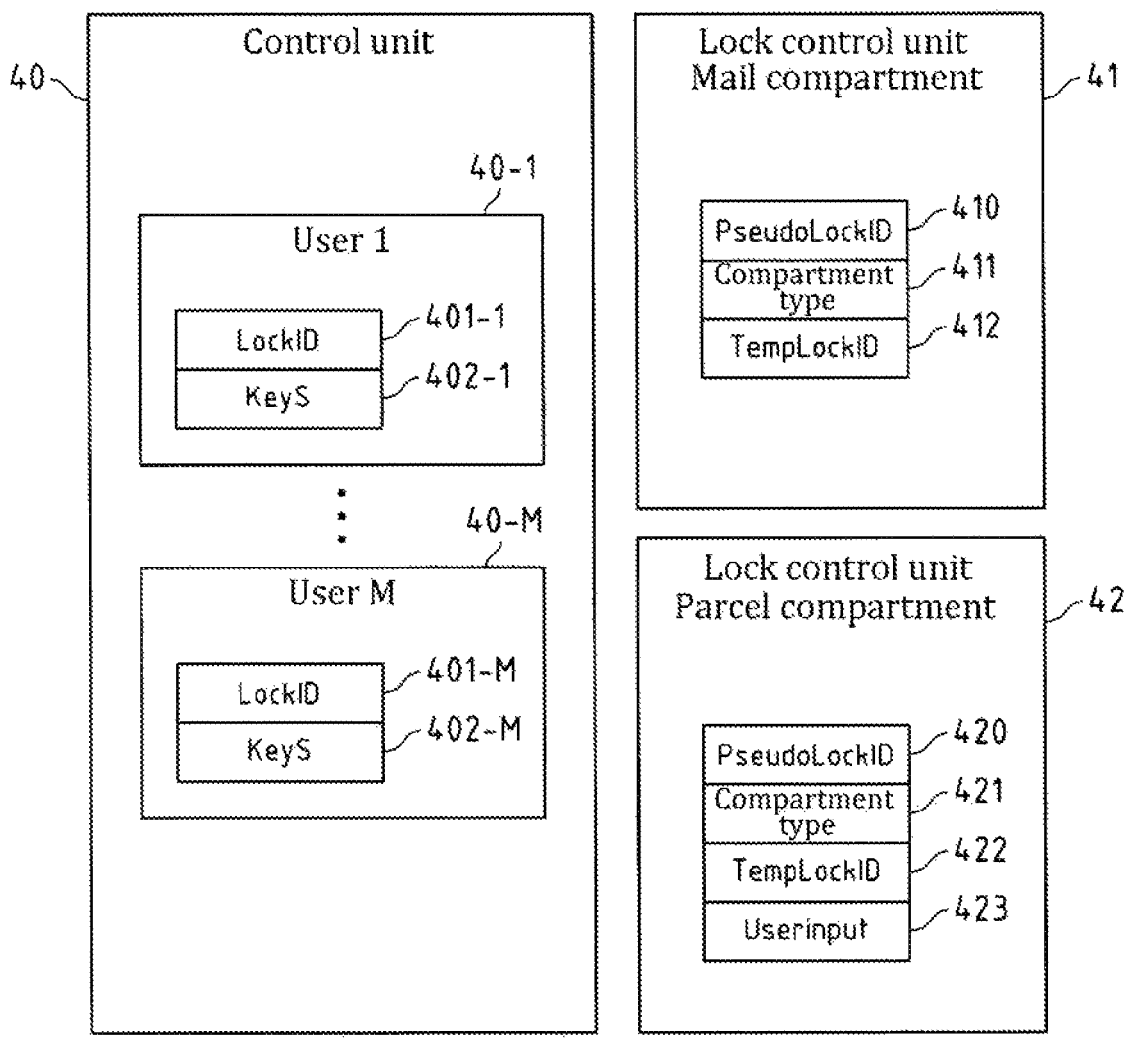
FIG. 4 shows a schematic illustration of exemplary memory occupancy in a control unit, a lock control unit of a mail compartment and a lock control unit of a parcel compartment according to the present invention.

FIG. 4 is a schematic illustration of exemplary memory occupancy in a control unit 40, a lock control unit 41 of a mail compartment and a lock control unit 42 of a parcel compartment according to the present invention. In this case, the memory occupancy 40 of the control unit corresponds, for example, to the memory occupancy in the control unit 7 in FIG. 2, with the result that the memory occupancy then at least partially describes, for example, the memory occupancy of the program memory 71, of a further memory of the processor 70 or of the external data memory 74. The memory occupancies 41 and 42 of the lock control units each correspond in this case, for example, to the memory occupancies of the lock control unit 8 in FIG. 3, with the result that the memory occupancy then at least partially describes, for example, the memory occupancy of the program memory 81, of a further memory of the processor 80 or of an external data memory.

The memory occupancy 40 of the control unit 7 shows that data records 40-1 to 40-M are stored there for a plurality of M users (where M is a natural number). Each of these data records 40-1 to 40-M is assigned to a user of the compartment system 1 and contains a LockID and a key KeyS. In the case of the data record 40-1, this data record therefore contains the LockID 401-1 and the key KeyS 402-1.

The LockID is permanently assigned to the user, that is to say is assigned to the user during the entire time for which the compartment system 1 is used by the user. It can be assigned to a new user after the user stops using the compartment system 1 (for example in the event of the user moving or dying). The LockID is assigned to the user, for example, when the user registers with a management system of the compartment system for use of the compartment system. The management system may be accommodated in the compartment system 1 itself, for example in the control unit 7, but may alternatively also manage a plurality of compartment systems 1 and possibly a plurality of delivery and/or collection containers (cf., in this respect, the discussion with respect to FIG. 9) and may be in the form of a central management system, for example a server. It is noted that there is no need for a direct communication connection between the compartment system and the management system for this purpose; the compartment system 1 can therefore be operated, for example, as an off-line compartment system which has to be initialized only upon activation, but does not require any access to the management system during ongoing operation.

The LockID may be, for example, a numerical or alphanumerical character string of a predefined length.

The key KeyS is used to check the authenticity and/or integrity of access authorization information which is received, by the control unit 7, from a delivery agent, a user or an electronic device used by the delivery agent or the user (for example a handheld scanner, a mobile telephone or a tag), at the control unit 7. The access authorization information contains, in particular, the LockID as the access authorization parameter and possibly further access authorization parameters which define, for example, a validity period of the access authorization information and/or define the extent to which the access authorization information grants access to the compartment system, etc. The key KeyS forms a symmetrical or asymmetrical key pair with a further key stored in the access authorization generation apparatus (for example the key server 90 in FIG. 9). Cryptographic operations, for example, are performed on the access authorization parameters in the access authorization generation apparatus using the further key in order to obtain a piece of checking information. This is then made available, together with the access authorization parameters, as access authorization information to the delivery agent, the user or an electronic device used by the delivery agent or user (for example stored thereon). If this access authorization information is now transmitted to the control unit or is input there in order to verify the access authorization to one or more compartments of the compartment system 1, the received access authorization information and the key KeyS can be used to check whether the access authorization information has integrity and is authentic. For example, the checking information is calculated again on the basis of the received access authorization parameters and the key KeyS according to the same cryptographic operations as in the access authorization generation apparatus and is compared with the received checking information. If there is a match, it is then assumed, for example, that the received access authorization information has integrity and is authentic. The cryptographic operations may comprise, for example, the formation of a Message Authentication Code (MAC) for the access authorization parameters on the basis of a key (for example on the basis of the further key). Examples of MACs are the Message Authentication Algorithm (MAA), the Keyed-Hash Message Authentication Code (HMAC) or the Cipher-Based Message Authentication Code (CMAC) specified by the NIST. If the further key and the key KeyS form a symmetrical key pair, these two keys are identical.

Like the LockID, the key KeyS is selected individually, that is to say differently, for each user of a compartment system.

For example, on the basis of the LockID contained in the received access authorization information, that data record which contains this LockID is selected from the data records 40-1 to 40-M, and the key KeyS contained in this data record is then used to check the authenticity and/or integrity of the received access authorization information. If the memory of the control unit 7 does not contain a data record for a LockID from a piece of received access authorization information, no access is granted, for example.

The data records 40-1 to 40-M can be written to the memory (for example the program memory 71, the further memory of the processor 70 or the external data memory 74), for example upon activation of the compartment system 1, for example via a wired or wireless maintenance interface of the control unit 7. Subsequent additions of data records and/or changes to data records can then likewise be carried out via this maintenance interface, for example.

Additionally or alternatively, the control unit 7 can communicate with a central unit (for example a management center, in particular a server) via a (for example wireless or wired) connection, for example. In particular, the respective control units of a plurality of compartment systems can communicate with this central unit via respective connections. The connection can be at least partially effected via the Internet. For example, the central unit can make changes to the respective memory occupancy 40 in one or more of the compartment systems, that is to say can add, remove or change one or more data records, for example. The central unit comprises, for example, a database containing the data records for all users of those compartment systems which are managed by the central unit. For example, the data records in this database are synchronized with the data records in the control units of these compartment systems, for example at regular or irregular intervals (for example each time data records are added, removed or changed in the database). For example, all data records in the database are synchronized in the respective memories of all control units or only a respective subset of the data records in the database (for example only the data records of the users of a respective compartment system are synchronized in the memory of the control unit of the compartment system).

Instead of storing the plurality of data records 40-1 to 40-M in the memory of the control unit 7, the control unit 7 may also have a communication interface which can be used to query a LockID and/or a key KeyS from a central unit. For example, each time access authorization information containing a LockID is received, the received LockID can be used to query the central unit, for example in order to check the validity of the LockID for the compartment system and/or in order to obtain the key KeyS assigned to this LockID. This dispenses with the local management/storage of this information in the control unit 7 of the compartment system 1.

It is also possible for the validity of the LockID and/or of the associated key KeyS to be queried only once and for this information to then be stored in the memory of the control unit 7 (for example as one of the data records 40-1 to 40-M). In this manner, the data records 40-1 to 40-M are then gradually obtained at the control unit 7.

The memory occupancy 41 of the lock control unit 8 of the mail compartment contains a PseudoLockID which, as already mentioned, is used to uniquely identify the lock control unit 8 and remains unchanged during the service life of the lock control unit. Furthermore, a variable is stored for the compartment type 411, which variable indicates that the compartment is a mail compartment. If mail compartments of different sizes are supported, the variable can also indicate the size of mail compartment. Finally, a variable TempLockID 412 is provided, to which the value of the LockID is statically written (that is to say for a plurality of delivery and/or collection operations) in order to reflect the fact that the mail compartment assigned to the lock control unit 8 is permanently assigned to the user (and therefore the LockID thereof).

The memory occupancy 42 of the lock control unit 8 of the parcel compartment likewise contains a PseudoLockID which again is used to uniquely identify the lock control unit 8 and remains unchanged during the service life of the lock control unit. A variable for the compartment type 421 is also provided and indicates that the compartment is a parcel compartment and indicates the size of the parcel compartment (for example using size designations "S", "M", "L", "XL", etc.). A variable TempLockID 422 is also provided. However, in contrast with the situation described above in the case of a mail compartment, different LockIDs in each case are written to this variable dynamically, rather than statically, in order to reflect the respective current assignment of a LockID—and therefore of the user assigned to the LockID—to the lock control unit 8 or the compartment. A different LockID can be respectively stored in the variable TempLockID of the same lock control unit 8 of a compartment, in particular for two successive processes each comprising the placing of a shipment in the compartment and the collection of the shipment from the compartment, in order to reflect the fact that the two processes relate to shipments from different users of the compartment system. The variable TempLockID is further used to indicate whether or not a compartment is occupied.

Finally, the memory occupancy 42 also comprises a flag Userinput which can be set to "FALSE", for example, in order to indicate that no shipment has been placed by the user in the compartment assigned to the lock control unit and can be set to "TRUE" in order to indicate that at least one shipment has been placed by the user in the compartment assigned to the lock control unit for collection by the delivery agent.

Figure 5A:
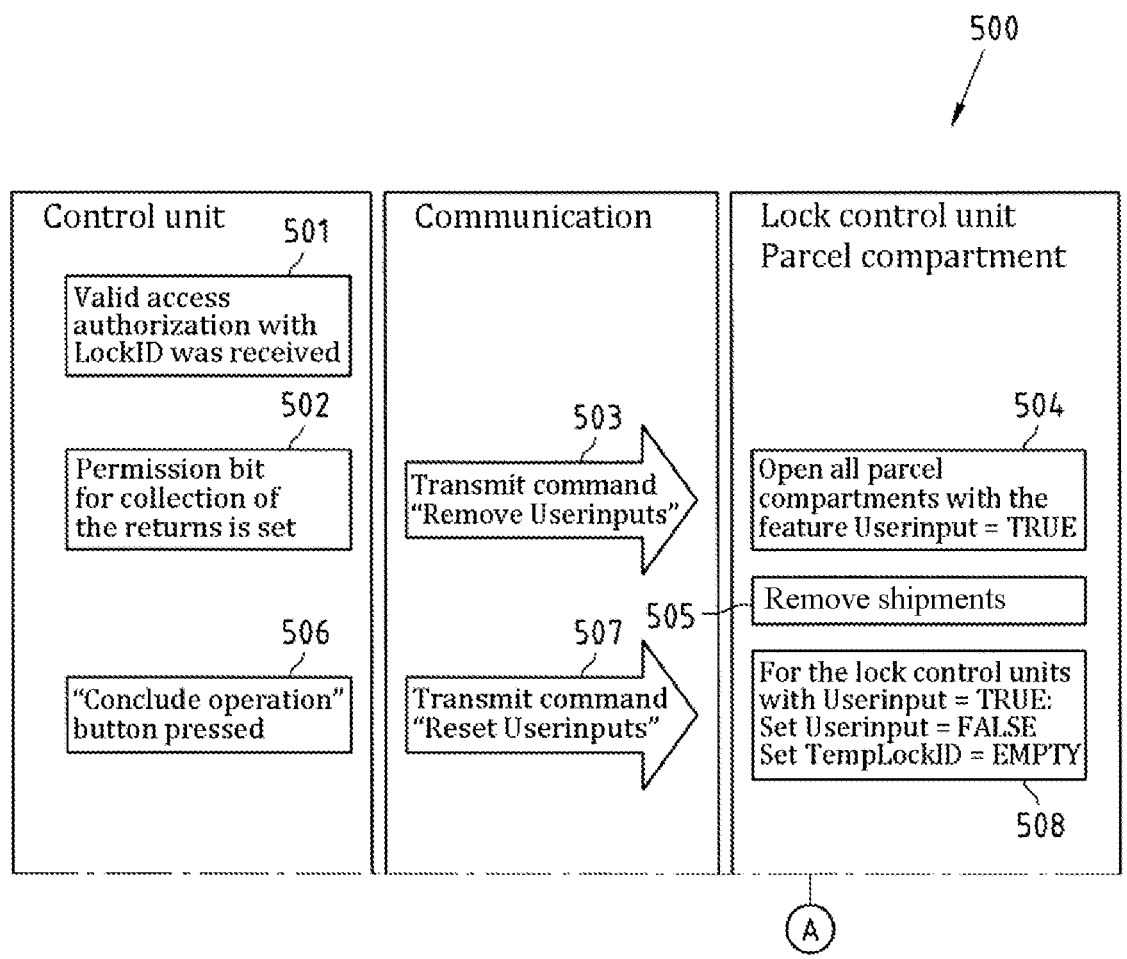
FIG. 5 (divided into FIG. 5A and FIG. 5B underneath FIG. 5A) shows a flowchart of an exemplary embodiment of a method according to the present invention relating to the removal of one or more shipments to be collected by a delivery agent and the placement of shipments by a delivery agent.
Figure 5B:
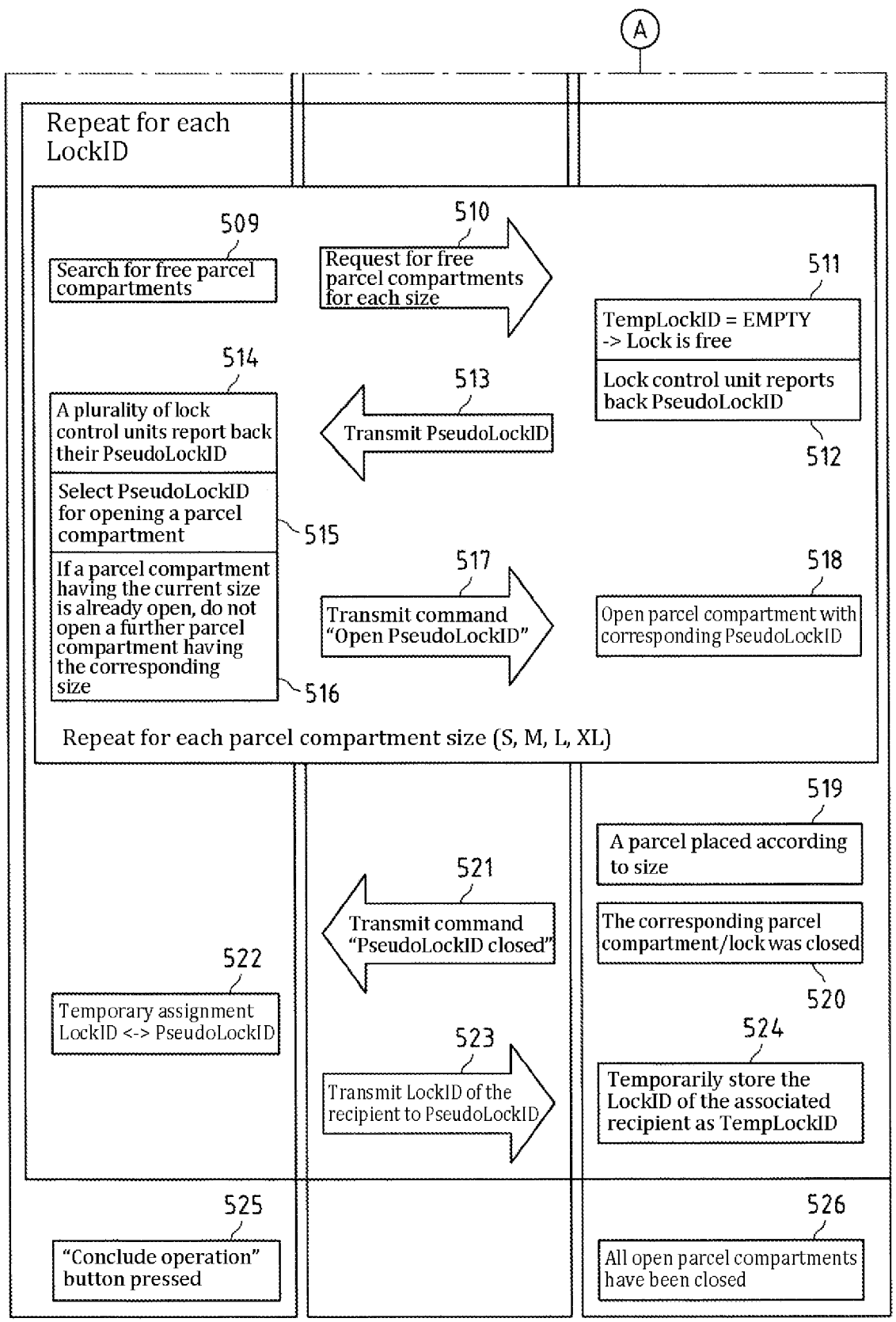

FIG. 5 shows a flowchart of an exemplary embodiment of a method according to the present invention relating to the removal of shipments to be collected by a delivery agent (in particular steps 502-508) and the placement of shipments by a delivery agent (in particular steps 509-526). In this case, the left-hand column of the flowchart 500 lists the steps which are performed by the control unit 7 (or its processor 70) or relate to the latter. The right-hand column lists the steps which are performed by lock control units 8 of the parcel compartments or relate to said lock control units. The central column shows the communication between the control unit 7 and the lock control units 8, which takes place via a bus, for example.

In step 501, a valid access authorization is received at the control unit 7.

For example, a piece of access authorization information is therefore received at the control unit 7 from a delivery agent (for example by means of manual or acoustic input) or from an electronic device belonging to the delivery agent (for example a handheld scanner or an NFC or RFID tag), its integrity and/or authenticity is/are checked and optionally further access authorization parameters contained therein are checked, for example in order to determine whether a validity period of the access authorization information, as defined by one or more access authorization parameters, has not yet expired (for example by comparison with a clock of the control unit 7) and/or whether the LockID contained in the access authorization information is actually stored in the control unit 7 (this may constitute, for example, the first check in terms of time since only the key KeyS needed to check the integrity and/or authenticity of the access authorization information can be selected on the basis of the LockID, for example, by using the received LockID, for example, to identify that data record of the data records 40-1 to 40-M (FIG. 4) which contains this LockID and then using the key KeyS contained in this data record to check the authenticity and/or integrity). If all of these checks are positive, it can be assumed, for example, that the received access authorization information reflects a valid access authorization.

The process of checking the presence of a valid access authorization may also comprise yet further cryptographic checks, for example in order to determine whether the correct device for presenting the access authorization information has been used, whether this device and/or the access authorization information has/have not been blocked etc.

The access authorization may relate, for example, to a first shipment which the delivery agent wishes to deliver to the compartment system. For this purpose, the delivery agent has selected the associated access authorization information, for example on his/her handheld scanner, for transmission to the control unit 7 (or confirms its selection), for example at least on the basis of one recipient address of the shipment and/or information which has been read from a code applied to the shipment. For example, the delivery agent selects the access authorization information (or confirms its selection) which contains a LockID which is associated with a user of the compartment system who is the recipient of the shipment.

The subsequent steps 502-508 describe the process of collecting shipments placed by users, which process is fundamentally optional. If the collection of shipments placed by users in a delivery system in which the compartment system 1 is used is not provided, these steps can be dispensed with without substitution, for example, and the variable Userinputs in the lock control units and the query thereof may then also be unnecessary.

A step 502 first of all checks whether an authorization bit for collecting shipments (returns) from the compartment system 1 has been set in the access authorization information. For example, the access authorization information contains an access authorization parameter "Permissions" comprising a plurality of bits which can each be set to "1" in order to indicate that this access authorization information provides authorization for particular predefined actions in the compartment system 1 (a "0" accordingly respectively indicates that there is no authorization to perform the action). Such an authorization for collecting shipments is granted, for example, only for delivery agents, but not for users of the compartment system 1.

In step 503, the command "Remove Userinputs" is then transmitted from the control unit to all lock control units 8 of the compartment system 1 (or only to all lock control units 8 assigned to parcel compartments). In this case, no specific addressing of the lock control units is used, for example, but rather the command is transmitted in "broadcast" to all lock control units of the compartment system 1 which then suitably evaluate or ignore the command.

This command is accordingly received by the lock control units 8. The lock control units then each check whether they contain a variable Userinputs which is set to "TRUE" (step 504). If this is the case, the respective lock control unit 8 causes the opening of the compartment assigned to it, for example by actuating the respective lock in order to unlock the lock.

Alternatively, the control unit 7 may previously have queried in "broadcast" which lock control units have the value Userinputs=TRUE, and may then selectively address (on the basis of the PseudoLockIDs) only those lock control units which have reported back that this applies to them with an opening command.

The "Remove shipment" display element in the display field 79 in FIG. 2 can then be used, for example, to signal to the delivery agent that he/she is now first of all supposed to remove shipments to be collected from the compartments (and, for example, is not supposed to use the open compartments to place shipments). In order to avoid, for example, the delivery agent closing one of the open compartments again before he/she has removed the shipment situated therein, a locking function of the locks of the open parcel boxes can be deactivated, for example while opening or after opening the parcel compartments. The locking function can be activated again, for example, only when the delivery agent has actuated the "Conclude operation" button (step 506). The locking function may be a latch function, for example. The deactivation and/or activation can be effected, for example, by the control unit 7 which accordingly instructs the respective lock control units for this purpose.

In a step 505, the delivery agent then removes the shipments from the open compartments. The delivery agent can then capture the parcels using his/her handheld scanner, for example, and/or can put them aside for picking up later (after the end of step 526).

If, in step 506, the control unit 7 then obtains the information indicating that the "Conclude operation" button (cf. the button field 78 in FIG. 2) has been actuated, that is to say the delivery agent has clearly ended the collection operation, it transmits the command "Reset UserInputs" to all lock control units 8 of the compartment system (or only to all lock control units 8 assigned to parcel compartments) in step 507. In step 508, this results in all lock control units 8, in which the variable Userinput was set to "TRUE", now setting this variable to "FALSE" (this indicates that the compartment no longer contains a shipment for collection) and also setting the field TempLockID to "EMPTY" (this indicates that the compartment is now no longer assigned to a user).

Alternatively, step 508 could also be performed, for example, directly together with steps 504 and/or 505, that is to say without the explicit request from the control unit 7 in step 507. It would then be possible to dispense with step 507.

After this collection operation, some of the emptied parcel compartments are still open and the delivery agent has already transmitted a LockID to the control unit 7 in step 501, which LockID must now be assigned to a parcel compartment of the compartment system 1. This is carried out in steps 519-524.

First of all, however, it will be ensured that at least one appropriately large parcel compartment of the compartment system 1 is also open for each possible parcel size. This is carried out in steps 509-518.

In step 509, the process of searching for free parcel compartments is started at the control unit 7 by transmitting a request (step 510) for free parcel compartments of a particular size, for example initially "S", to all lock control units 8 (or only to all lock control units 8 assigned to parcel compartments). In step 510, the lock control units each check whether their variable TempLockID has been set to "EMPTY" and whether the requested parcel compartment size matches the parcel compartment size according to their Compartment type variable (step 511). If this is the case, the PseudoLockID identifying the respective lock control unit is transmitted back to the control unit 7 in steps 512 and 513. In this case, the control unit 7 need not be specifically addressed; if communication takes place via a bus, the transmission of a message with the PseudoLockID contained therein may be sufficient if the control unit 7 is aware that it must understand this message as a response to its request (step 510). The message may also contain an explicit identifier which indicates that it is a response to the request in step 510.

From the one or more PseudoLockIDs obtained for the specific compartment size "S", the control unit 7 then selects, for example, a PseudoLockID, for example according to a random principle (steps 514, 515). This has the advantage that the parcel compartments are worn out uniformly over the service life of the compartment system. Alternatively, particular parcel compartments may also be preferably opened, for example parcel compartments which are in the vicinity of the control unit, in order to spare the delivery agent relatively long routes between the control unit and parcel compartments and therefore speed up the delivery process. Since the PseudoLockIDs are statically allocated to the lock control units, it is possible to determine, for example upon activation of the compartment system 1, which PseudoLockIDs belong to lock control units (and therefore parcel compartments) "close" to the control unit. PseudoLockIDs can then preferably be selected from this group of PseudoLockIDs determined upon activation.

Optional step 516 checks whether a compartment of the size "S" is already open. This information may be available to the control unit, for example, if those lock control units 8 which open their assigned parcel compartments in step 504 communicate at least the size of the open parcel compartment back to the control unit 7 (not illustrated in FIG. 5). However, the respective PseudoLockID should also be preferably communicated in this case. Step 516 could alternatively also be performed before step 510 and, if it is determined that a compartment of the size "S" is already open, steps 510-515 and 517-518 could be dispensed with for the compartment size "S".

However, if step 516 is not performed, the consequence is only that a plurality of compartments of the same size are possibly open at the end of the process in steps 509-518, which, although meaning that more compartments have to be closed by the delivery agent in step 525 than would actually be necessary, the delivery agent also has a greater selection within the group of open parcel compartments of the same size in terms of which parcel compartment he/she ultimately uses for delivery. For example, he/she may prefer a parcel compartment close to the ground for a heavy parcel.

In step 517, a command to open the parcel compartment assigned to the lock control unit having the selected PseudoLockID is transmitted by the control unit 7 and is accordingly implemented by the corresponding lock control unit 8 in step 518. In this case, the lock control unit 8 concerned realizes, on the basis of the PseudoLockID, that it is intended to open its parcel compartment.

Steps 510-518 are then respectively carried out for the different parcel compartment sizes available (for example "S", "M", "L", "XL"), with the result that at least one compartment is open for each of these parcel compartment sizes at the end of the process.

The control unit preferably stores a piece of information indicating which PseudoLockIDs have each been opened in step 517 and which parcel compartment size belongs to the respective PseudoLockID for recourse during the further course of the method.

If a free parcel compartment is no longer available for one or more parcel compartment sizes, a corresponding warning can be output (for example by means of the display element "No capacity" of the user interface 79 of the control unit), for example, and steps 515-518 are then each not carried out.

In steps 519-524, the LockID already transmitted to the control unit by the delivery agent is now assigned to a parcel compartment.

This is effected by the delivery agent placing the shipment in one of the open parcel compartments and closing the parcel compartment. The lock control unit 8 of this parcel compartment then captures, for example, at least the closing of the parcel compartment (for example using a sensor 11, as explained with respect to FIG. 3), cf. step 520. Optionally, there may also be a sensor for detecting that a shipment has actually been placed in the compartment, as likewise already explained with respect to FIG. 3, cf. optional step 519. If such a sensor is not present, it is inferred, purely from the closing of the door of the parcel compartment, that a shipment has been placed.

The lock control unit 8 whose assigned parcel compartment has been closed then transmits a message indicating that its assigned parcel compartment has been closed in step 521. This message contains the PseudoLockID of the lock control unit 8. The control unit 7 evaluates this information in step 522 and associates the obtained LockID with this PseudoLockID.

In step 523, the control unit 7 then transmits a message containing the LockID for processing by the lock control unit 8 having the PseudoLockID. The lock control unit 8 receives this LockID and stores it in its variable TempLockID in step 524. This indicates that the lock control unit 8, and therefore also the parcel compartment assigned to it, is now associated with this LockID (and therefore also with the user associated with the LockID) and that the parcel compartment is occupied (with at least one shipment for this user).

If the delivery agent wishes to deliver shipments for other recipients (users) to the compartment system 1, steps 501, 509-518 and 519-524 must each be performed again for each of these shipments, that is to say a valid piece of access authorization information must first of all be obtained for the respective shipment (with a respective LockID) (step 501), it must then be ensured that at least one parcel compartment of each size is open (steps 509-518) and then the LockID must be associated with one of the open parcel compartments (steps 519-524).

In this case, it is now possible to use, in step 516, information (PseudoLockIDs and parcel compartment sizes) relating to already open parcel compartments which—as explained above—could be reported back from the lock control units to the control unit in the context of step 504, on the one hand, and information (PseudoLockIDs and parcel compartment sizes) stored by the control unit 7 in step 517 and information (PseudoLockIDs) relating to parcel compartments each closed in step 521. The control unit therefore then has a complete overview of the currently open parcel compartments and their size at any time.

If all shipments to be delivered have been processed, the delivery agent can actuate the "Conclude operation" button of the user interface 79 (see FIG. 2) in step 525 (detected by the control unit 7 in step 526). The "Close all compartments" display element of the user interface 79, for example, is then used to signal to the delivery agent (for example by flashing, additionally or alternatively by means of an acoustic signal) that he/she should close all compartments, for example until this has been carried out (step 525). When all parcel compartments have been successfully closed, the "Confirmation" display element can also be used to provide the delivery agent with feedback (again using an additional acoustic signal, for example).

The check in order to determine whether all parcel compartments are actually closed can be carried out by the control unit 7, for example on the basis of information relating to closures of parcel compartments (not illustrated in FIG. 5) carried out after step 525, since, as stated above, each time a parcel compartment is opened in step 517, the control unit can track which compartment has been opened on the basis of the PseudoLockID and can again track which parcel compartments have been closed before step 525 (step 521) on the basis of the PseudoLockID. As already explained, the control unit 7 could also detect which parcel compartments have been opened in step 504 if the associated lock control units 8 report their respective PseudoLockIDs back to the control unit 7.

In the description above, it was initially assumed, by way of example, that the delivery agent delivers only one shipment for each recipient (user). It is naturally also possible to deliver more than one shipment to a user. This can be carried out, for example, by placing the plurality of shipments in the same parcel compartment. Additionally or alternatively, shipments for a user may also be placed in a plurality of parcel compartments. The LockID associated with this user is then accordingly stored in the lock control unit of each parcel compartment in which these shipments are placed (step 524). In this case, steps 509-518 for ensuring that a parcel compartment of each size is always open are performed repeatedly for the same LockID obtained in step 501, for example each time again if it is communicated to the control unit 7, according to step 521, that a parcel compartment (of a particular size) has been closed (but not temporally before step 524 following step 521 has been concluded) or at least each time the control unit 7 is of the opinion that a parcel compartment of a particular compartment size is currently no longer open. The control unit 7 then ensures that a further parcel compartment of the same size is promptly opened so that either a parcel for the same user (same LockID) or a parcel for another user (different LockID) can be placed in this further parcel compartment. The sequence of steps 509-518 (or one of its modifications described above) would therefore then be initially performed once, for example, in the event of joint delivery (that is to say in one load, for example) of a plurality of shipments to a plurality of users by a delivery agent, after the valid access authorization information for the first user (first LockID) of the plurality of users has been received (step 501) and would then be performed each time (but not more often, for example) the control unit 7 obtains, according to step 521, a piece of information indicating that a parcel compartment (of a particular size) has been closed or the control unit 7 is of the opinion that a parcel compartment is currently not open for at least one compartment size.

The process of removing shipments delivered in this manner by the recipients (users) is explained later with reference to the flowchart 700 in FIG. 7.

Figure 6:
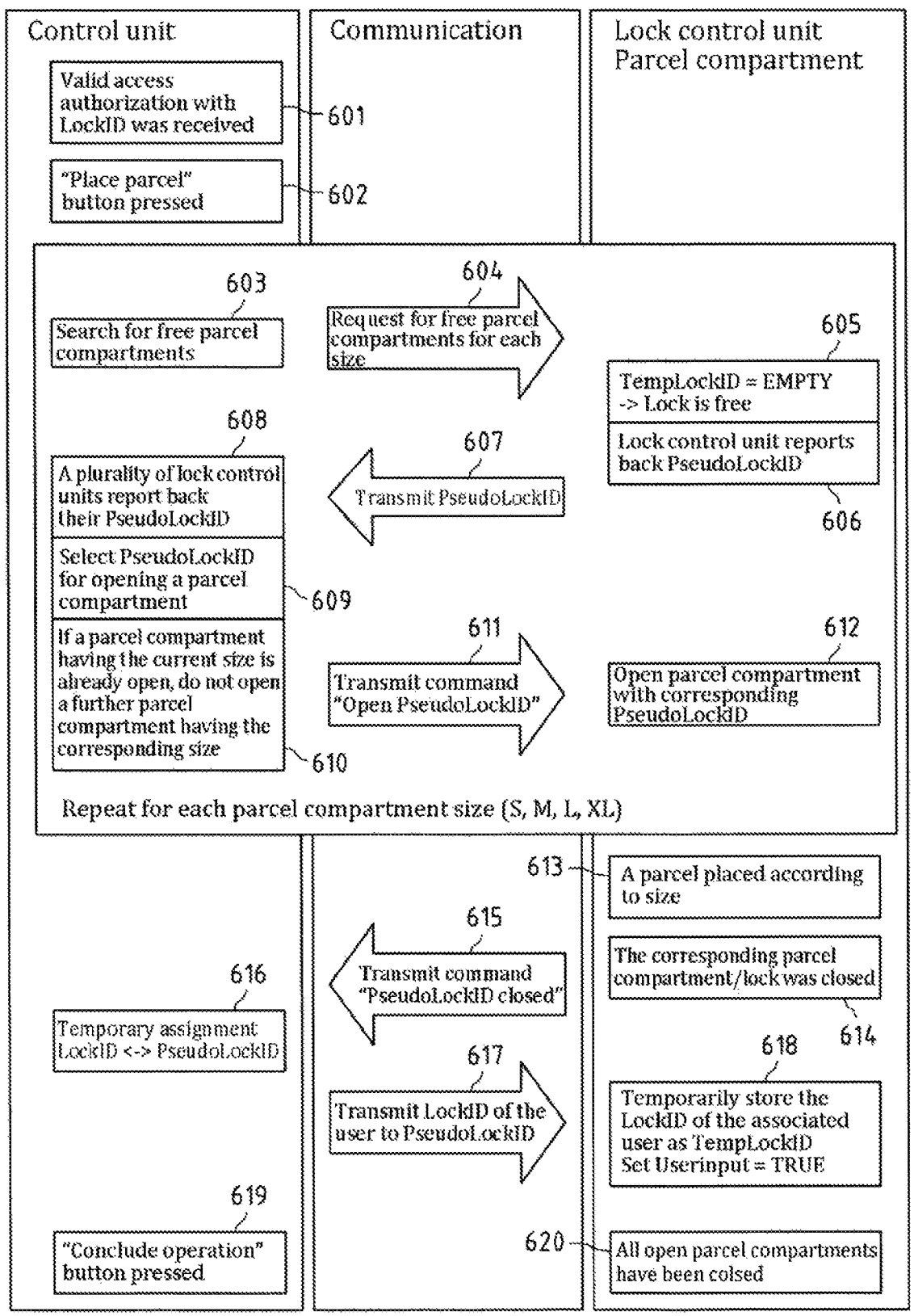
FIG. 6 shows a flowchart of an exemplary embodiment of a method according to the present invention relating to the placement of one or more shipments to be collected by a delivery agent by a person.

However, the flowchart 600 in FIG. 6 is first of all used to illustrate how a user of the compartment system 1 can place shipments in the compartment system which can then be collected by the delivery agent according to steps 502-508 of the flowchart 500 in FIG. 5 which have already been described.

FIG. 6 shows a flowchart 600 of an exemplary embodiment of a method according to the present invention relating to the placement of one or more shipments to be collected by a delivery agent by a person or a user. The left-hand column of the flowchart 600 again lists in this case the steps which are performed by the control unit 7 (or its processor 70) or relate to the latter. The right-hand column lists the steps which are performed by lock control units 8 of the parcel compartments or relate to said lock control units. The central column shows the communication between the control unit 7 and the lock units 8, which takes pace via a bus, for example.

Figure 7:
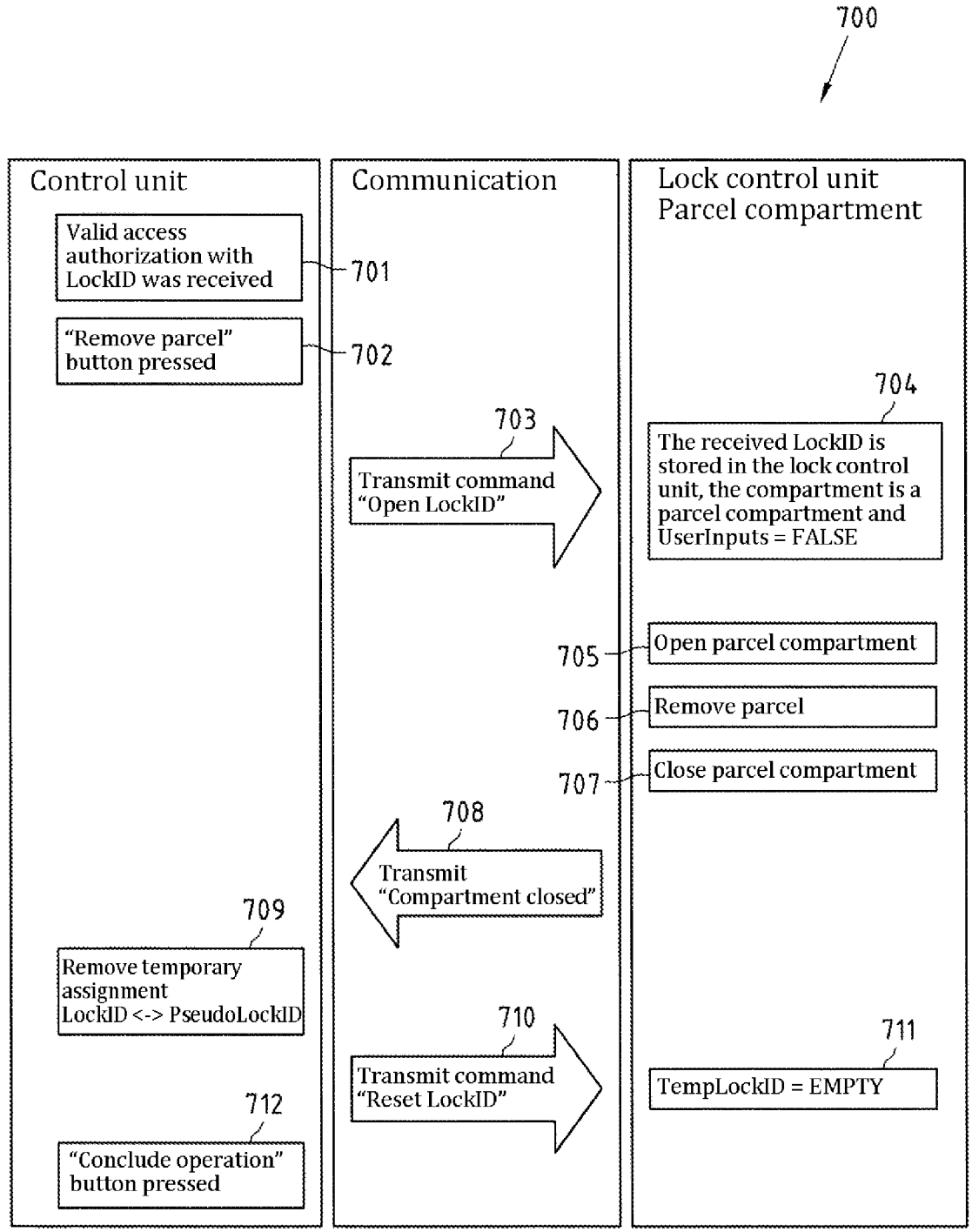
FIG. 7 shows a flowchart of an exemplary embodiment of a method according to the present invention relating to the removal of one or more shipments placed by a delivery agent in a parcel compartment by a person.

In the description of the flowchart 600, it is assumed, by way of example, that the process in the flowchart 600 is an independent process which is not associated with a process of making it possible to remove one or more letters from a mail compartment of the compartment system (cf. the flowchart 800 in FIG. 8) and/or a process of making it possible to remove one or more parcels from one or more parcel compartments of the compartment system 1 (cf. the flowchart 700 in FIG. 7). However, such an association is readily possible. For example, this can take place in the form in which the mail compartment belonging to the user is first of all opened upon presentation of a valid access authorization (process of making it possible to remove letters) and then, if one or more shipments have been placed in the compartment system and the user so desires, the corresponding one or more parcel compartments containing the placed shipments are opened (process of making it possible to remove parcels) and then, if the user so desires, the process of making it possible for the user to place one or more shipments can be carried out In this case, the order of the last two processes can also be swapped. It goes without saying that, in the case of such coupling, a valid access authorization has to be obtained at the control unit 7 only once for the two or three associated processes and not each time for each of the two or three associated processes.

In step 601, the control unit 7 receives, from the user or a device belonging to the user (for example a mobile telephone or an NFC or RFID tag), a valid access authorization containing the LockID assigned to the user. This step takes place substantially in a similar manner to step 501 in FIG. 5 which has already been described, with the result that reference is made to the above description in this respect In particular, access authorization information from the user or his/her device may therefore have been received at the control unit 7, its authenticity and/or integrity may have been checked (using the key KeyS stored in the control unit and the obtained access authorization information) and, in addition to the validity of the LockID, the validity of further access authorization parameters from the access authorization information may also have been checked.

For example, an access authorization parameter "Permissions" of the access authorization information may have an element (for example a bit) which indicates whether the user is actually authorized to place shipments to be collected (returns). The checking of this element can likewise be carried out in step 601, for example, or in a separate step and may be the necessary prerequisite for carrying out the subsequent method steps.

In contrast to the device belonging to a delivery agent, a device belonging to the user (for example a mobile telephone or an NFC or RFID tag) may contain only one piece of access authorization information and not a plurality of pieces of access authorization information, with the result that it is possible to dispense with a selection by the user. The user must then, for example, only initiate the process of transmitting the access authorization information to the control unit 7 (for example by actuating a user interface element on his/her device) or must confirm on his/her device that his/her access authorization information is intended to be transmitted to the control unit 7 but need not make any selection from a plurality of pieces of access authorization information.

In step 602, the control unit 7 obtains the information indicating that the "Place parcel" button (see the button field 78 in FIG. 2) has been pressed. This starts the process of making it possible for the user to place one or more shipments to be collected.

Since all parcel compartments of the compartment system 1 are closed, it is first of all necessary to open one or more parcel compartments. This is carried out in steps 603-612 in a similar manner to steps 509-518 (and optionally their described modifications) in FIG. 5 which have already been described above. In particular, an attempt is therefore again made to open a parcel compartment of each size. Information relating to the open parcel compartments (on the basis of the PseudoLockID) and their size is then stored in the control unit 7, for example, in particular so that the latter can understand for what compartment size another compartment must be opened when a compartment is closed and/or which compartments are still open at the end of the method and should be closed.

The LockID of the user is then allocated to a parcel compartment in steps 613-618 which correspond substantially to the above-described steps 519-524 in FIG. 5, but with the difference that, in step 618, the value of the variable TempLockID is not only set to the value of the LockID obtained in step 601 (in order to associate this parcel compartment with the LockID of the user and to indicate that it is occupied) in the lock control unit 8 of that parcel compartment in which the user has placed the one or more shipments, but the variable Userinputs is additionally set to TRUE. This is used, for example, during collection by the delivery agent, by the control unit 7 or the lock control units 8 to be able to distinguish (step 504 in FIG. 5) which occupied parcel compartments (that is to say TempLockID not empty) contain a shipment to be collected (Userinputs=TRUE) and in which parcel compartments only a delivered shipment has not yet been removed by the respective user (Userinputs=FALSE). Another difference from FIG. 5 (in particular with respect to steps 519/520) is naturally the fact that a user, and not the delivery agent, places the one or more shipments in the parcel compartment.

The placement operation by the user is ended in steps 619 and 620 which take place in a similar manner to steps 525 and 526 already described above. The user therefore actuates the "Conclude operation" button and is then requested to close all parcel compartments which are still open.

In order to simplify the description, it was assumed in the flowchart 600 that the user places only one shipment for collection. However, it is also possible to either place a plurality of shipments in one parcel compartment or to place the plurality of shipments in a plurality of parcel compartments. In particular, the situation in which at least two parcel compartments of the same size are required is covered by the fact that steps 603-612, which ensure that at least one parcel compartment of each size is respectively open, are carried out not only once (as illustrated in FIG. 6) but additionally each time a lock control unit 8 reports in step 615 that a parcel compartment has been closed (but temporally not before step 618 which follow steps 615 is concluded, for example) or the control unit 7 is of the opinion that a parcel compartment of at least one compartment size is currently not open.

As already mentioned above, the flowchart 600 is fundamentally presented as an independent process. Nevertheless, the text below is intended to briefly deal with the situation in which, in response to the reception of the valid closing authorization in step 601, the user is not only enabled to place one or more shipments but the user can also empty his/her mail compartment, as is also described below in the flowchart 800 in FIG. 8.

If the mail compartment is opened for the user, for example, before the user presses the "Place parcel" button (step 602), the scenario may occur in which the user does not immediately close his/her mail compartment again after removing the letters, that is to say the mail compartment is open. If the above-described process in steps 603-612 is then performed in order to open parcel compartments for the purpose of placing shipments to be collected, there is the risk of the user placing a shipment in the mail compartment which is still open and not in one of the parcel compartments. However, the delivery agent does not have any access authorization for the mail compartment, that is to say cannot remove a shipment which is present therein and is actually intended for collection by the delivery agent (it is sufficient for the delivery agent to be able to insert letters through the mail slot in the mail compartment; an opening in the door of the mail compartment is not required for this purpose). In order to prevent this incorrect placement of a shipment in the mail compartment, provision may be made, for example, for it not to be possible to lock the lock of the mail compartment after the mail compartment has been opened and before the actuation of the "Conclude operation" button (step 619) has been detected. For example, after step 619, the control unit transmits a command "Activate locking function of lock of mail compartment" containing the LockID or the PseudoLockID of the affected lock control unit 8. The relevant lock control unit 8 then realizes, on the basis of the LockID or PseudoLockID (and possibly a piece of information indicating that only a mail compartment is affected), that the locking function is intended to be activated again and accordingly controls the lock assigned to it. The locking function may be, for example, a latch function, that is to say a function whereby locking also automatically takes place upon closing a door or flap of the mail compartment. If the locking is based, for example, on blocking of a locking hook inserted into the lock by means of a locking element, the locking element can be moved into the release position and held there in order to deactivate the locking function, for example. Alternatively, as already explained above, the locking function can be electronically deactivated by immediately unlocking the lock again if locking is detected in each locking process during the desired deactivation period. The locking function of the lock of the mail compartment can be deactivated, for example, when opening of the mail compartment is caused, that is to say in step 804 in FIG. 8 for example, that is to say by receiving a corresponding deactivation instruction in the command transmitted in step 804, for example. Alternatively, however, the lock control unit 8 of the mail compartment may already have been programmed such that the locking function initially remains deactivated during each opening operation until an explicit activation signal is received.

FIG. 7 shows a flowchart of an exemplary embodiment of a method according to the present invention relating to the removal of one or more shipments placed by a delivery agent in a parcel compartment by a user (the recipient of the one or more shipments). These shipments were placed by a delivery agent in the compartment system 1 according to step 519 in FIG. 5, for example. One or more shipments for the user were placed, for example, by the delivery agent in one or more parcel compartments of the compartment system 1. In this case, the left-hand column of the flowchart 700 again lists the steps which are performed by the control unit 7 (or its processor 70) or relate to the latter. The right-hand column lists the steps which are performed by lock control units 8 of the parcel compartments or relate to said lock control units. The central column shows the communication between the control unit 7 and the lock units 8, which takes place via a bus, for example.

It is assumed that the operation of making it possible for the user to remove the shipments according to the flowchart 700 is an independent process which need not be associated with a process of making it possible to remove letters (FIG. 8) and/or a process of making it possible for the user to place shipments to be collected (FIG. 6). However, such an association is readily possible and the access authorization then needs to be transmitted only once to the control unit and checked there, for example.

In step 701, a valid access authorization is received at the control unit. This takes place in a similar manner to step 601 in FIG. 6 which has already been described above, that is to say from a mobile telephone or an NFC or RFID tag belonging to the user, for example.

During this check or in a separate check, it is also possible to check whether the access authorization authorizes the user to remove shipments from parcel compartments which are associated with the LockID associated with the user, which is a necessary prerequisite for carrying out the subsequent method steps, for example.

In an optional step, the control unit 7 can then check, for example, whether the compartment system 1 contains at least one shipment for the user. This can be carried out, for example, by querying some or all lock control units 8 for correspondence with the criteria of whether the TempLockID corresponds to the LockID (of the user) received in the access authorization information, whether a parcel compartment is involved and whether the variable UserInputs has been set to "FALSE" (otherwise it would be a shipment placed by the user him/herself for collection by the delivery agent). If positive feedback is then received at the control unit 7, from at least one lock control unit 8, indicating that these criteria are all satisfied in said lock control unit, the control unit 7 can assume that at least one shipment has been placed in the compartment system 1 for the user. In a further optional step, the control unit can indicate this to the user, for example, by means of the "Remove shipment" display element in the display field 79 of the control unit 7 (FIG. 2), for example.

In step 702, the control unit 7 detects that the "Remove parcel" button in the button field 78 of the control unit 7 (FIG. 2) has been actuated and starts the process for making it possible for the user to remove one or more shipments from the compartment system 1.

For this purpose, the command "Open LockID" is transmitted again to all lock control units of the compartment system 1 (or only to all lock control units associated with parcel compartments) in step 703, for example. The command may further contain, for example, a piece of information indicating that only parcel compartments are intended to be opened (may be superfluous, for example, if the compartment system has only parcel compartments and no mail compartments) and/or that only parcel compartments whose variable Userinputs=FALSE are intended to be opened (may be superfluous, for example, if collection of shipments which have been placed by users is not supported). (Alternatively, the opening command may also be transmitted only to that lock control unit (identified by its PseudoLockID) which is known to have stored the value LockID as TempLockID, for example because this information was previously stored in the control unit 7 or because the control unit 7 previously queried all lock control units in order to find out which of the lock control units has stored the value LockID as TempLockID.)

The lock control units 8 then check in step 704 whether these criteria apply to them.

If this is the case, the lock control units 8 to which the criteria apply cause the opening of their respectively assigned parcel compartment in step 705. If shipments have been placed in a plurality of parcel compartments for the user, for example, all of these parcel compartments accordingly open.

In a step 706, the user can then remove the shipment(s) from the one or more parcel compartments opened in step 705.

In step 707, the user then closes all open parcel compartments. This is detected by the respectively assigned lock control units 8 and is respectively communicated in a message "Compartment closed", with the result that the control unit 7 can evaluate this/these message(s). The message may respectively contain the PseudoLockID of the respective lock control unit, in particular.

The control unit 7 can then cancel the temporary association between the PseudoLockID and the LockID in a step 709. In particular, a command "Reset LockID" which is separate for each lock control unit 8, for example, is communicated in step 710 (for example to all lock control units 8 or only to all lock control units 8 assigned to parcel compartments), which command contains the PseudoLockID of the respective lock control unit 8 from which the LockID is intended to be deleted. On the basis of the respective PseudoLockID, the lock control units 8 receiving the command identify which of them set the variable TempLockID to EMPTY, that is to say are intended to delete the LockID. After deleting the LockID from the variable TempLockID, the respective compartment is free again.

On the basis of the PseudoLockIDs contained in the message 708, the control unit 7 can identify which parcel compartments have been closed. If those lock control units 8 whose assigned parcel compartments have been opened additionally reported their PseudoLockID back to the control unit 7 in step 705, the control unit could track, after obtaining the messages in step 708, whether all open parcel compartments have been closed by the user and could request the user to close all compartments (for example using the "Close all compartments" display element of the display field 79 (FIG. 2)) if this is (still) not the case.

The operation of collecting shipments by the user is therefore concluded. Optionally, the user can explicitly express this by actuating the "Conclude operation" button of the button field 78 of the control unit 7 (FIG. 2). Alternatively, this is assumed, for example, if no further action is carried out within a predefined period of time since the last user interaction with the compartment system 1.

The process of making it possible for the user to collect shipments from the compartment system 1 according to the flowchart 700 (FIG. 7) can be optionally carried out before a process of making it possible for the user to place shipments in the compartment system 1 according to the flowchart 600 (FIG. 6). This can be achieved, for example, by the user actuating the "Place parcel" button of the button field 78 of the control unit 7 at the end of the flowchart 700 (for example as an alternative to step 712). The process described in the flowchart 600, for example, then starts, but beginning with step 603. The reverse order is naturally also possible in principle (process of placement by the user before the process of collection by the user), but the previously described variant in which the user first of all collects the shipments and then places shipments to be collected is preferable with regard to the limited capacity of the compartment system (first emptying, then filling).

Figure 8:
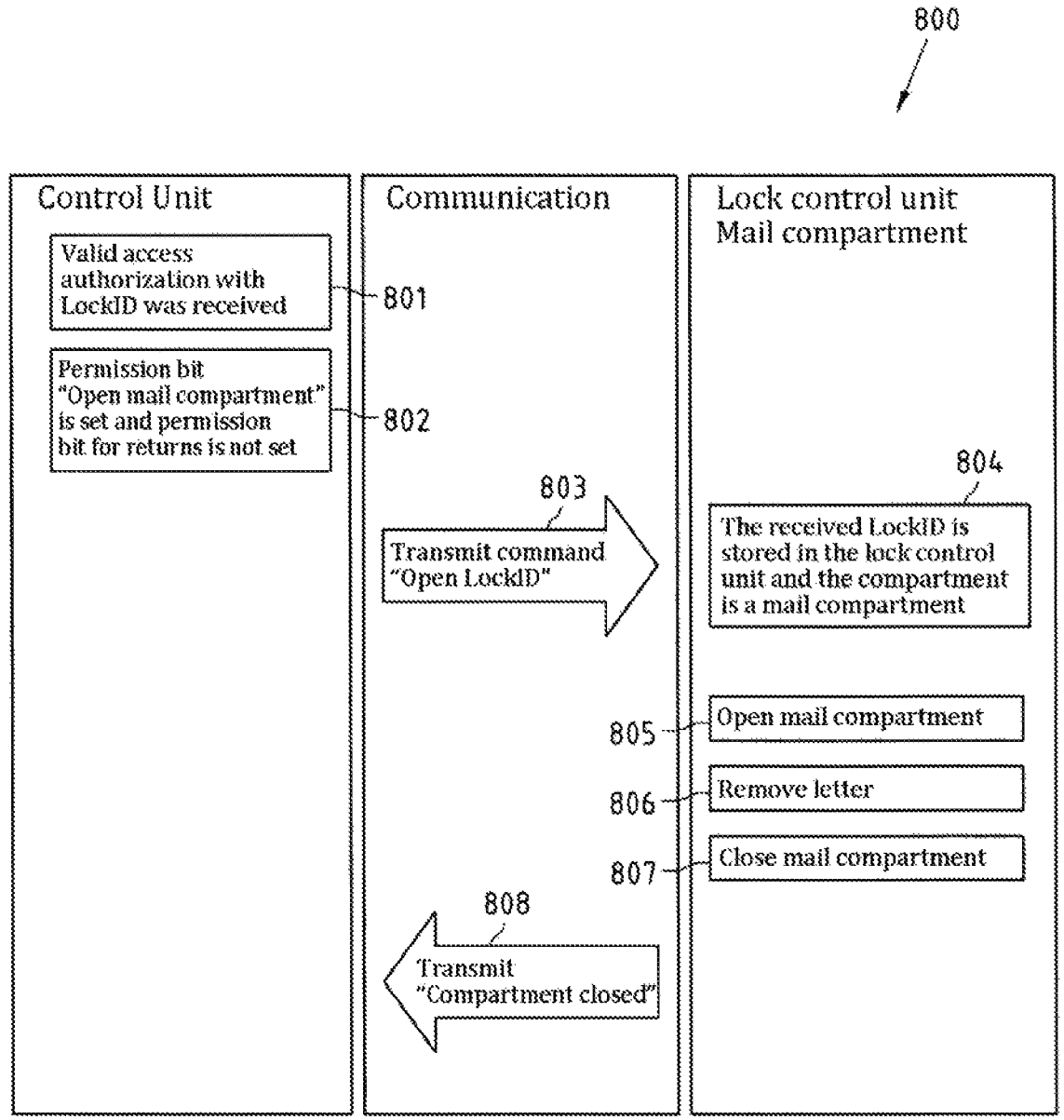
FIG. 8 shows a flowchart of an exemplary embodiment of a method according to the present invention relating to the removal of one or more shipments delivered by a delivery agent to a mail compartment by a person.

FIG. 8 is a flowchart 800 of an exemplary embodiment of a method according to the present invention relating to the removal of one or more shipments (in particular letters) delivered by a delivery agent to a mail compartment by a user of the compartment system 1 (the recipient). The left-hand column of the flowchart 800 again lists in this case the steps which are performed by the control unit 7 (or its processor 70) or relate to the latter. The right-hand column lists the steps which are performed by the lock control unit 8 of the mail compartment or relate to said lock control unit. The central column shows the communication between the control unit 7 and the lock unit 8, which takes place via a bus, for example.

As already explained with respect to FIG. 4, LockIDs are respectively statically written to the variable TempLockID in the lock control units assigned to mail compartments and are not deleted over the course of a plurality of delivery processes, in which a mail compartment was respectively involved, and are then reallocated again. This is also reflected by the flowchart 800; in contrast with the flowchart 700 in FIG. 7, the LockID is not deleted (there is therefore no equivalent to steps 709-711) after the compartment has been opened (step 805) and it has been reported (step 808) that the compartment has been closed again.

If the control unit 7 has obtained a valid access authorization containing a LockID from the user or from a device belonging to the user in step 801, which takes place in the manner already described with respect to step 701 in FIG. 7, a step 802 checks whether the access authorization information (for example on account of an accordingly set element of an access authorization parameter "Permissions") authorizes opening of the mail compartment, which is a necessary prerequisite for carrying out the further method steps, for example.

In a step 803, the command "Open LockID" is then communicated. This command contains at least the LockID and preferably (if this information is not otherwise clear from the context) a piece of information indicating that only mail compartments are affected by the command. The command is received by all lock control units 8 of the compartment system 1, for example.

The lock control units 8 then check in step 804 whether the compartments assigned to them are mail compartments (for example on the basis of the Compartment type variable, see FIG. 4) and (possibly only when this is the case) whether they have stored the value of the LockID in their variable TempLockID. If these conditions have been met, the relevant lock control unit 8 causes the opening of its assigned mail compartment (step 805).

Alternatively, lock control units (which satisfy the criteria of the mail compartment and LockID) which have previously been queried in "broadcast" can also be selectively addressed/opened here again on the basis of the Pseudo-LockIDs delivered in response to the query.

The user can then remove the letter(s) in the mail compartment in a step 806.

In step 807, the user then closes the mail compartment, which is then communicated by the associated lock control unit 8 in a message in step 808. The control unit 7 can conclude from this message, assuming that only one mail compartment is assigned to each user, that all mail compartments are now closed and no further actions are required. If it is possible for a plurality of mail compartments to be assigned to one user, the control unit 7 can check whether all open mail compartments belonging to the user have actually been closed by the latter. This check can be carried out, for example, as already explained on the basis of parcel compartments with respect to the flowchart 700 in FIG. 7.

The process of making it possible to remove shipments from mail compartments according to the flowchart 800 can be linked to the processes in the flowchart 600 (FIG. 6) and/or 700 (FIG. 7), as mentioned. For example, steps 801-808 of the flowchart 800 first of all take place and then steps 702-711 of the flowchart 700 and/or steps 602-620 of the flowchart 600, that is to say either as alternatives to one another or in succession, in which case any order is possible, but the performance of steps 702-711 before steps 602-620 may have the advantage that the limited capacity of the compartment system 1 is utilized better.

Figure 9:
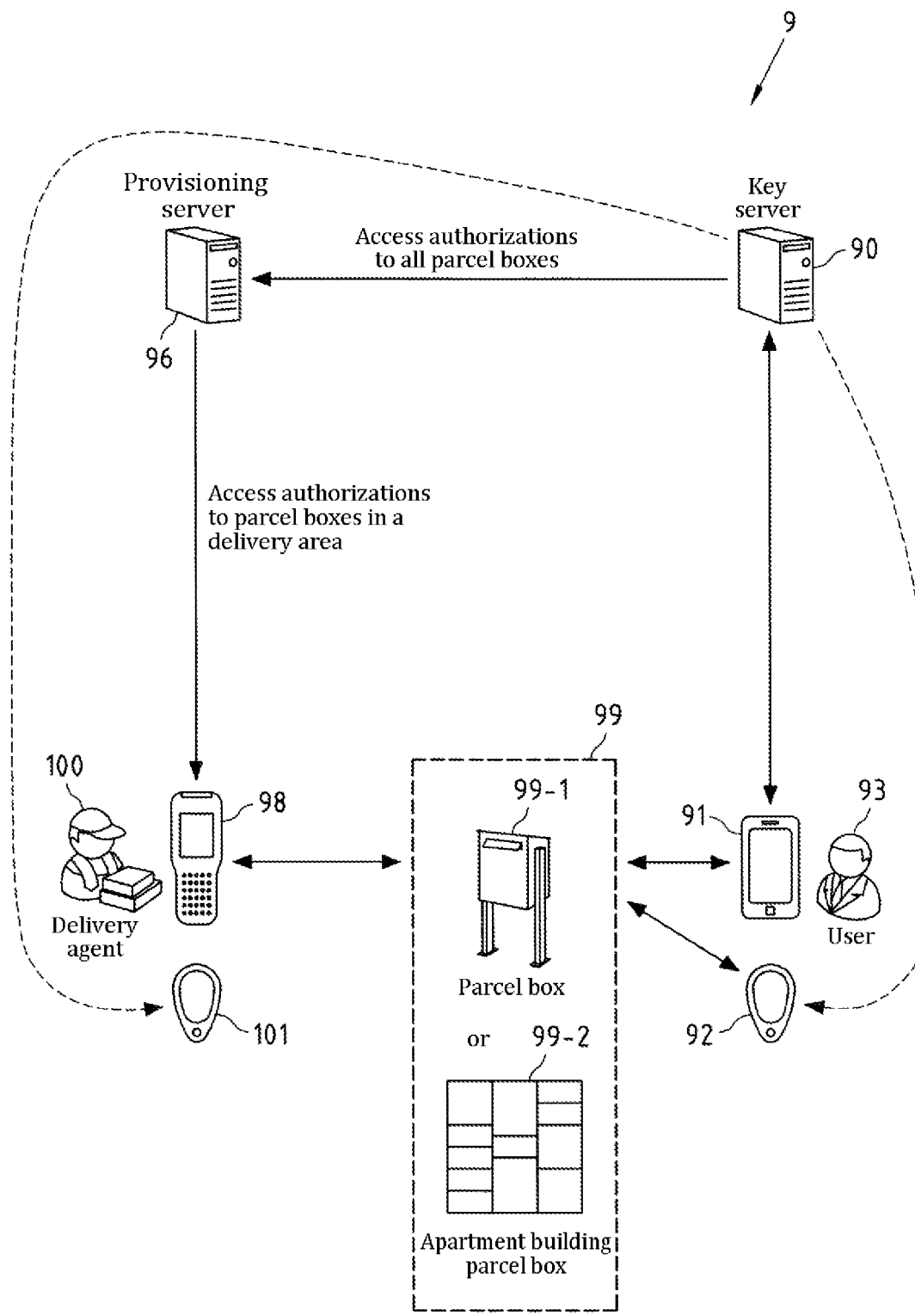
FIG. 9 shows a schematic illustration of an exemplary embodiment of a delivery and/or collection system in which a compartment system according to the invention is used.

FIG. 9 is a schematic illustration of an exemplary embodiment of a delivery and/or collection system 9 in which a compartment system 1 according to the invention is used.

Such a delivery and/or collection system is operated by the applicant, for example, and makes it possible to comprehensively deliver shipments (for example parcels, small packages and letters) to users 93 and to collect shipments from the user 93. This system 9 uses, inter alia, a plurality of delivery and/or collection containers 99-1 which are either assigned to one household (for example the user and his/her family), but can also be concomitantly used by some neighbors. One example of such a delivery and/or collection container 99-1 is the so-called "parcel box" from the applicant which has a mail compartment and a parcel compartment, for example, and is configured both for receiving letters and parcels and for collecting parcels and letters by the delivery agent 100. The parcel box 99-1 has an electronic lock which can be used to open the parcel compartment and the mail compartment (for example separately). Further examples of delivery and/or collection containers are the parcel butler, garden sheds, garages and trunks and/or interiors of vehicles each provided with electronic locks, with the result that they can be at least unlocked by an accordingly authorized delivery agent. The parcel box is used below as an exemplary representative of a delivery and/or collection container, but the explanations accordingly apply to the other delivery and/or collection containers.

The prerequisite for opening the compartments of the parcel box (and accordingly for the receiving spaces of the further delivery and/or collection containers mentioned) are valid access authorizations which are generated by a key server 90 in the form of access authorization information and are made available both to the user 93 on his/her access authorization verification device (for example a mobile telephone 91 or an NFC or RFID tag 92) and to the delivery agent 100 on his/her access authorization verification devices (for example a handheld scanner 98 or an NFC or RFID tag 101) so that the user 93 and the delivery agent 100 can show the parcel box 99-1 that they are authorized to open the respective compartments.

In this system 9, a piece of access authorization information comprises, for example, a number of access authorization parameters which define, for example, the scope and the temporal validity of the access authorization information.

One of the access authorization parameters is the identifier of the lock or the lock control unit of the parcel box 99-1 and is referred to as the LockID. This is permanently stored in the lock control unit of the parcel box 99-1. A piece of access authorization information presented at a parcel box 99-1 must necessarily contain the LockID of the lock control unit of the parcel box 99-1 so that access can be granted on the basis of this access authorization (for the situation in which the other access authorization parameters in the access authorization also indicate that access can be granted in the desired scope).

In addition to the access authorization parameters, the access authorization information also contains a piece of checking information which is generated by means of cryptographic operations using a key stored in the key server 90. This checking information can be double-checked by the lock control unit of the respective parcel box 99-1, on the basis of a key KeyS which is stored in the respective parcel box 99-1 and forms an asymmetrical or symmetrical key pair (both keys are the same in the latter case) with the key in the key server, in order to ensure that a piece of access authorization information presented at the parcel box 99-1 has actually been generated by the key server 90 and was not changed during transmission. The key pair is selected differently for each parcel box 99-1, that is to say the keys KeyS stored in the parcel boxes 99-1 and the respectively associated keys in the key server 90 are different in each case.

The access authorization information for a parcel box 99-1 is newly generated by the key server 90 at regular intervals, for example, with a limited validity period in each case, and is stored in the devices 91, 92 belonging to the user 93 and in the devices 98, 101 belonging to the delivery agent 100. In this case, the access authorization information stored in the devices 91, 92 belonging to the user 93 may have a considerably longer validity than the access authorization information stored, in particular, in the handheld scanner 98 belonging to the delivery agent. For example, the validity of this access authorization information may be only one day. It can be additionally ensured, for example, by using a provisioning server 96, that only the respective access authorization information for those parcel boxes 99-1 for which a delivery agent has shipments to deliver (and/or collect) on one day is stored in the handheld scanner 98 belonging to the delivery agent 100 on this day.

According to exemplary embodiments of the present invention, this delivery and/or collection system 9 is extended to the use of compartment systems 99-2 which are used in apartment buildings, for example, and are used there as a parcel compartment system for a plurality of households in the apartment building or as a combined mail and parcel compartment system for a plurality of households in the apartment building. Such a compartment system is referred to as an "apartment building parcel box", for example.

In this case, it is useful that a number of N parcel compartments of the compartment system are used by M>N users since not all of these M users will have a shipment to be delivered or collected by the delivery agent every day. This requires a dynamic allocation of parcel compartments to users, which is not readily possible in the existing system 9 based on parcel boxes 99-1 with permanently allocated LockIDs.

In exemplary embodiments of the invention, it is also proposed, inter alia, for the purpose of solving this problem, that a fixed LockID is not allocated to the lock control units of the individual compartments of the compartment system, but rather the lock control units have only a variable TempLockID in which the LockID (known from the system based on parcel boxes) is stored, during allocation of the parcel compartment assigned to the lock control unit to a user, only for the duration of this allocation. Since the LockID was already associated with a respective user (in particular a user registered for the respective parcel box 99-1) in the system based on parcel boxes 99-1, this principle of association can also be adopted for the compartment system by virtue of a control unit of the compartment system storing a respective LockID (and a respective key KeyS) for each user of the compartment system (cf. FIG. 4) and dynamically allocating these LockIDs to the compartments for respective delivery and/or collection operations. From the point of view of the key server 90, there is therefore no difference between generating access authorization information for a parcel box 99-1, on the one hand, and for a compartment of an apartment building parcel box 99-2, on the other hand.

The result is therefore the advantageous configuration which is illustrated in FIG. 9 and in which both parcel boxes 99-1 and apartment building parcel boxes 99-2 can be operated alongside one another in the system 9 and the same infrastructure and systematics can be used in this case to generate the access authorization information.

The interlock data bus (ILDB) according to the invention and its transmission protocol (comprising the physical layer, the data link layer, the communication layer and the application layer) are described below using FIGS. 10-16. The ILDB can be used, for example instead of the CAN bus, to connect the lock modules 12/lock control units 8 to the central control unit 7 of the component system 1. The ILDB can also be readily used, however, to connect different electrical components to one another and/or to a control unit (for example in vehicles or other devices or systems) and shall therefore also be understood as having been disclosed separately from the specific field of application of communication between lock modules/lock control units and a central control unit in a compartment system.

The ILDB is in the form of a multimaster bus, for example, in which both the control unit 7 and the lock control units 8 can act as master. The ILDB is based on collision detection and not on collision avoidance (or collision resolution), for example. This entails the advantage of operational reliability on the electrical side and prevents undefined bus states in the event of inappropriate access.

1. Physical Layer
1.1 Transceiver

The bus driver concept of the CAN bus is used as the physical basis for the ILDB bus system. This bus system provides the advantage of differential and interference-free data transmission. In the case of slow data rates, this symmetrical data transmission can be performed without a shield. This bus system additionally provides the advantage of collision strength, with the result that no unwanted transverse currents occur in the case of simultaneous access by a plurality of subscribers. For example, a conventional CAN bus transceiver is used to convert bits into electrical signals to be transmitted via the physical line (for example a two-wire or three-wire line).

On account of the modular and flexible structure, the cabling cannot be in the form of an ideal bus structure, for example. Rather, it resembles a tree structure, for example. In order to minimize the electrical reflections on the spur lines, the data rate and the signal rise time are minimized, for example. The resulting low frequency spectrum produces only insignificant reflection levels with respect to the very short line length of the bus which do not adversely affect the data transmission.

The termination likewise cannot be effected at both ends, as in a conventional bus system, for example. The termination is effected, for example, using 120 ohms at the control unit 7 and 8.25 kohms at each lock control unit 8. This results in 128 ohms for an exemplary maximum configuration of 64 locks. No additional termination is required as a result.

Figure 10:
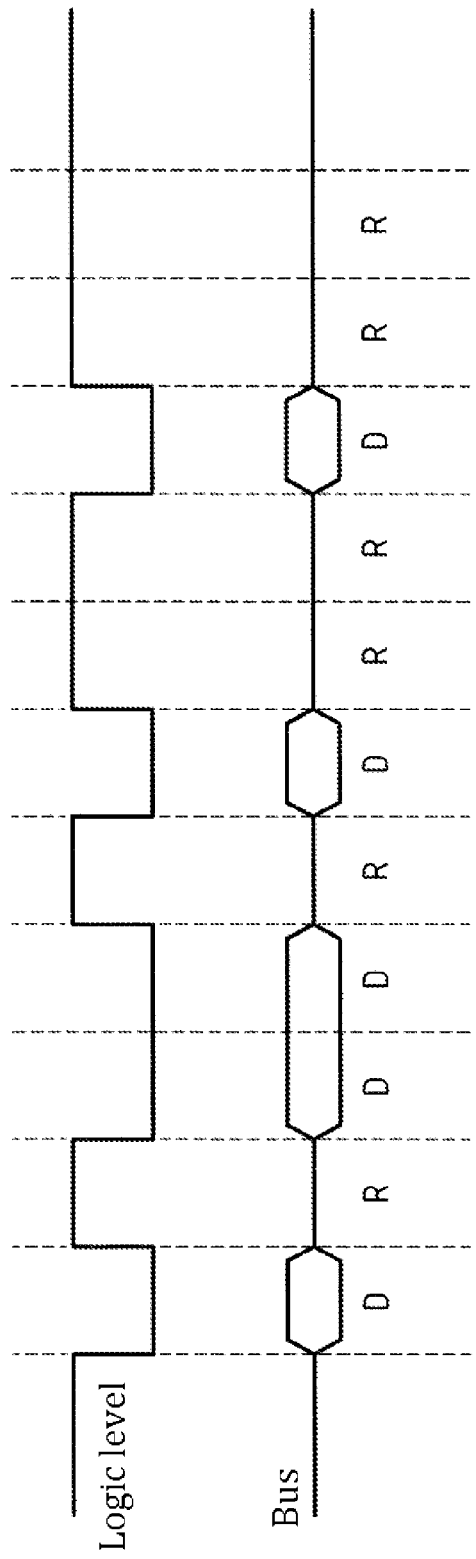
FIG. 10 shows a schematic illustration of bus levels on the physical layer in one exemplary embodiment of a bus according to the invention.

During transmission by means of the CAN bus transceiver, the logic levels (high and low) of the data transmission are represented on the bus as recessive and dominant levels, as illustrated in FIG. 10 (in this case "D" stands for dominant (for example voltage difference of 0.5-3.0 V) and "R" stands for recessive (for example voltage difference of less than 100 mV)). Logic high signals are represented as recessive bus levels and logic low signals are represented as dominant bus levels. The difference between these two levels is that a dominant level on the bus can override a recessive level on the bus. If two bus subscribers now transmit at the same time, the recessive levels of one transmitter are overwritten by the dominant levels of the other transmitter. This behavior is used to detect collisions during transmission.

1.2 Protocol

The CAN transmission protocol is not used in the ILDB for reasons of costs of the electronic components. Instead, the communication protocol for the ILDB is formed by means of UART. UART is an electronic circuit which is used to implement digital serial interfaces. The circuit is implemented, for example, as an independent electronic component (for example a UART chip or module) or as a functional block of a more highly integrated component (for example a microcontroller). A UART interface is used, in particular, to transmit and receive data via a data line and forms the standard for serial interfaces, for example in PCs and microcontrollers. The interface having various forms (for example RS-232 or EIA-485) is also very widespread in the industrial sector. The data are transmitted as a serial digital data stream with a fixed frame which consists of a start bit, five to a maximum of nine data bits (eight data bits in the present case, for example), an optional parity bit for detecting transmission errors and a stop bit.

Figure 11:
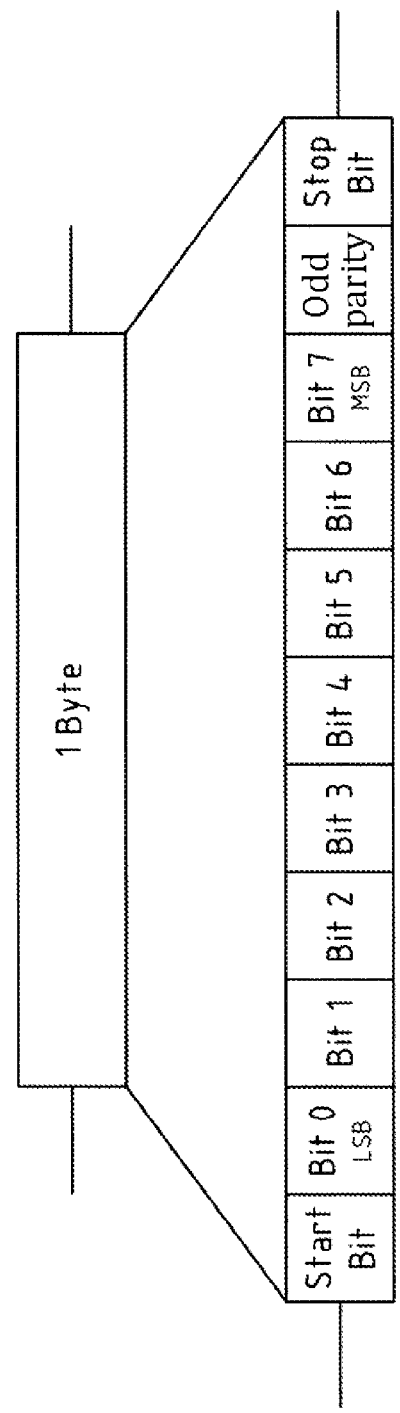
FIG. 11 shows a schematic illustration of an 8-bit packet transmitted on the physical layer in one exemplary embodiment of a bus according to the invention.

The data are therefore always transmitted in 8-bit packets each with a start bit, a parity bit and a stop bit, as illustrated in FIG. 11, rather than in a bit-by-bit manner like in the CAN bus. The bus is scanned with edge detection only during bus arbitration, for example, since here short times prevent increased inappropriate access and the bus load is therefore reduced. In order to check for a collision, each transmitted byte is simultaneously received by the transmitter again and is compared with the transmitted value. If a difference is detected here, the transmitter aborts the transmission attempt and starts a new transmission attempt when the bus is identified as free again. In order to detect data transmission errors in good time, a parity bit representing an odd parity with logic 1 is transmitted with each transmitted byte. This error detection is used only to simply and quickly detect transmission errors.

The ILDB therefore does not differ physically, based on the electrical levels, from the CAN bus. In particular, the same transceiver and/or the same line can be used. However, the signal transmission in the time domain (that is to say the bit timing) and the arbitration of the bus subscribers are somewhat different In this case, the bit sequence of the UART is used, rather than the bit sequence of CAN. CAN provides stuff bits and acknowledge bits in the protocol, for example, which do not need to be present in the ILDB, for example. The structure of a message likewise differs. CAN uses, for example, adapted field lengths with different bit lengths which are not byte-oriented in the protocol. In the ILDB protocol, all field lengths are oriented to bytes, for example, since the UART can process only data sequences having a length of 8 bits, for example. The data protocol used in the ILDB has similarities to RS-485 (EIA-485), with the difference that the ILDB uses active arbitration with collision detection, for example, and operates with different electrical signals (CAN). The individual bus subscribers need not be pre-addressed in the ILDB, as may be conventional or necessary in the case of RS-485 and CANopen.

In contrast to the CAN protocol which operates substantially in a message-based manner (for example with message IDs), the ILDB allows subscriber-based operation (for example with subscriber IDs, as is explained in yet more detail below). In the ILDB, each message is addressed, for example, to one particular subscriber (unicast message) or to a plurality of particular subscribers (broadcast message) which must transmit a response after obtaining a message, for example. This makes it possible to specifically address a subscriber (for example a lock control unit).

2. Data Link Layer

Figure 12:
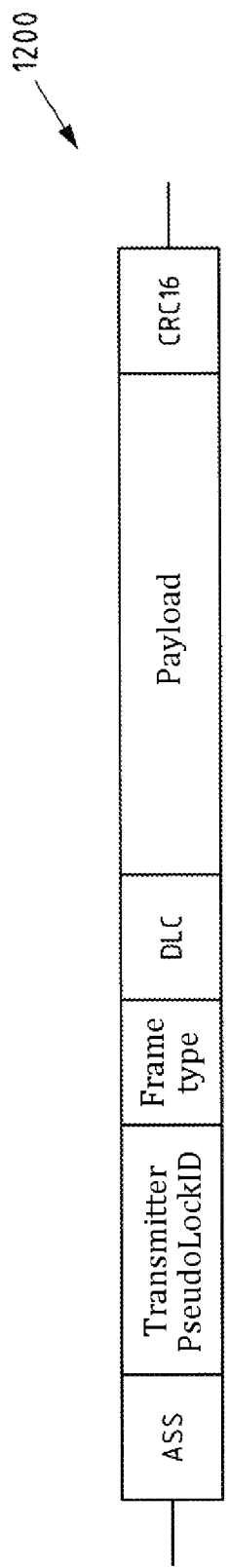
FIG. 12 shows a schematic illustration of a message object which is transmitted on the data link layer in one exemplary embodiment of a bus according to the invention.

Data are transmitted on the ILDB in individual message objects. Each of these objects 1200 is composed as illustrated in FIG. 12 (the length of the message object 1200 may comprise 13 . . . 64 bytes, for example). The parts of a message object 1200 are individually described below. It is noted at this point that the message object 1200 is not necessarily tied to the ILDB and can also be used on other bus types to transmit information.

2.1 ASS (Arbitration Sync Symbol)

This symbol is formed by the first transmitted byte, for example, and is used to arbitrate the transmitters. This byte is formed, for example, by means of a bit shift of a particular number of bits of the transmitter's own PseudoLockID. This bit mask makes it possible to detect a collision on the bus at a very early time if two or more subscribers are transmitting at the same time. The symbol ASS forms the second of three arbitration measures. In addition, this symbol ASS may be such that only the subscriber having the higher PseudoLockID aborts the transmission attempt and the transmitter with the lower PseudoLockID remains on the bus and can conclude its transmission attempt.

2.2 Transmitter PseudoLockID

The PseudoLockID of the transmitter, for example, is transmitted as the second element in the message object 1200. This PseudoLockID is, for example, a unique identifier of each bus subscriber. This identifier consists of eight bytes, for example. It is derived, for example, from the unique CPU ID of the semiconductor manufacturer (for example of the processor 70 of the control unit or the processor 80 of the lock control unit 8) by means of a hash code. This PseudoLockID is used as the third of three arbitration measures. If the two preceding arbitration measures are the same in the case of more than one subscriber on the bus (since these measures operate only with a shortened identifier or functions of the shortened identifiers), the PseudoLockID decides which of the two subscribers remains on the bus. This field also provides the sender address which is required for the response from the receiver, for example.

2.3 Frame Type

This field consists of one byte, for example, and indicates the message type. There are six different message types:
Request=specific request for one bus subscriber
Broadcast request=request for all bus subscribers
Response ACK=feedback to the request: confirmation
Response NACK=feedback to the request: invalid
Response CANCEL=feedback to the request: is not supported
Broadcast response=feedback to the request from all bus subscribers 2.4 DLC (Data Length Count)

This field indicates the length of the payload field in bytes. The DLC field has a length of one byte, for example.

2.5 Payload

The useful data of the message are transmitted in this field. This field may have a length of 0 . . . 50 bytes, for example.

2.6 CRC16

This field forms the checksum for the transmitted message. The length is two bytes, for example. It is calculated by each transmitter and is concomitantly transmitted. For example, each receiver uses this checksum to check the message for errors.

2.7 BIT and AST

In order to avoid simultaneous bus access by a plurality of bus subscribers, there are defined access rules, for example, which must be complied with by each bus subscriber. This regulation involves detecting the free bus. There may be a requirement, for example, that a subscriber can transmit its data on the data bus as the transmitter only when the bus is detected as being free by the subscriber.

In order to regulate this, there is a defined data gap, which is referred to as the bus idle time or BIT for short, in the ILDB, for example. This BIT time is a constant time, for example, for which each subscriber must wait after the completion of the message received last before it detects that the ILDB is free.

Figure 13:
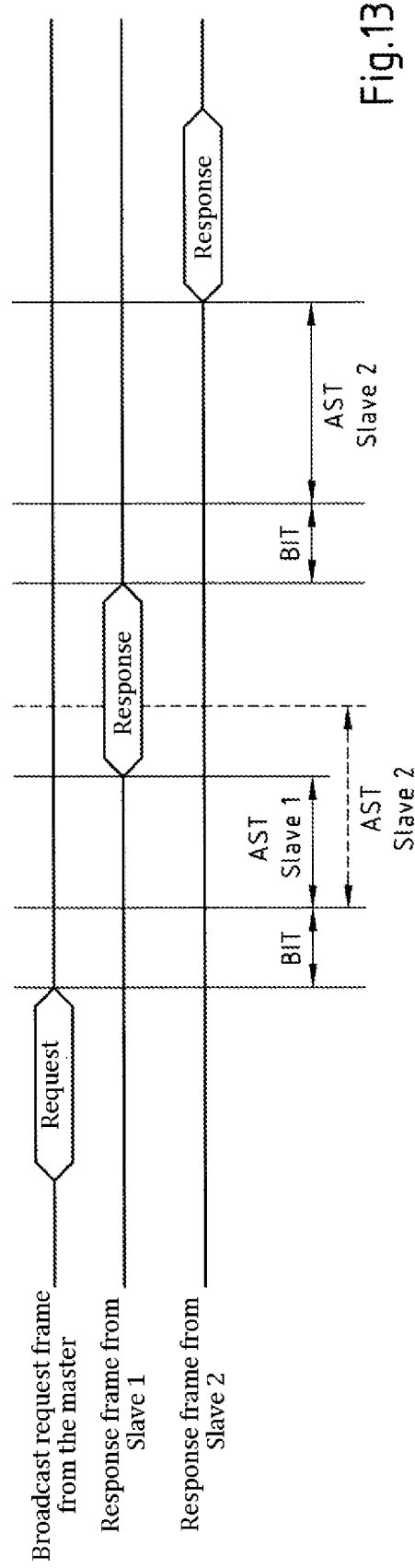
FIG. 13 shows a schematic illustration of bus arbitration in one exemplary embodiment of a bus according to the invention.

If a bus subscriber wishes to transmit data, it must additionally wait for the AST (Arbitration Sync Time), for example, before it places its first data byte onto the bus. The AST is a time window having a different length for each bus subscriber, for example. It is formed from the lower 8 bits of the unique PseudoLockID. The AST forms the first of the three arbitration measures between the subscribers. The bus subscriber having the shortest AST always transmits first. At this moment, the other bus subscribers detect that the bus is occupied and change to the receiver mode. The next subscriber can transmit only when all subscribers detect that the bus is free again. This is schematically illustrated in FIG. 13.

Three criteria for bus arbitration result from this mechanism and the measures described above:
1. AST=subscriber-specific time window for transmitting data
2. ASS=subscriber-specific data symbol which is transmitted as the first byte
3. PseudoLockID=unique subscriber ID which is transmitted at the start of the message These three measures, combined with the collision stability of the CAN bus transmission method and the unique CPU ID of the semiconductor manufacturer, ensure reliable communication with all bus subscribers without having to previously configure the latter.

Figure 15:
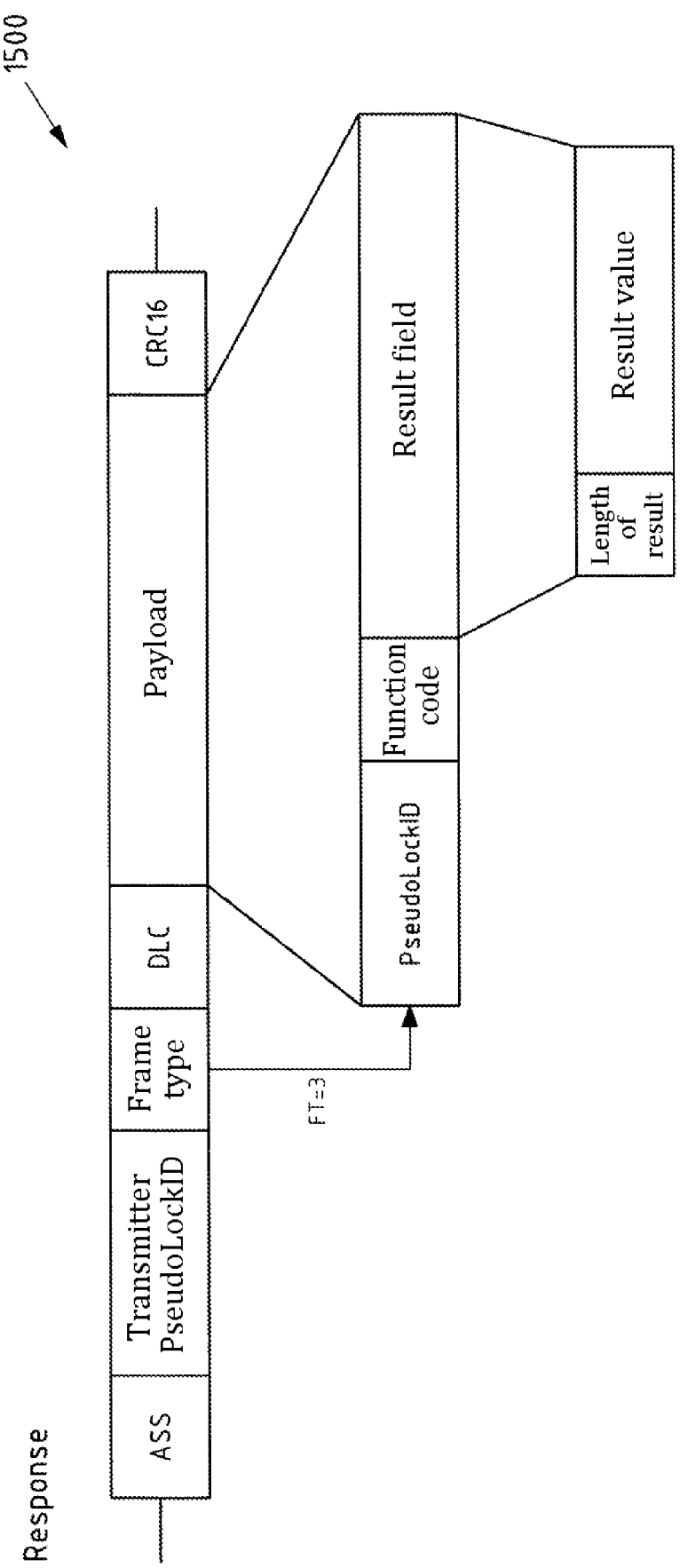
FIG. 15 shows a schematic illustration of a response message transmitted on the communication layer in one exemplary embodiment of a bus according to the invention.
Figure 16:
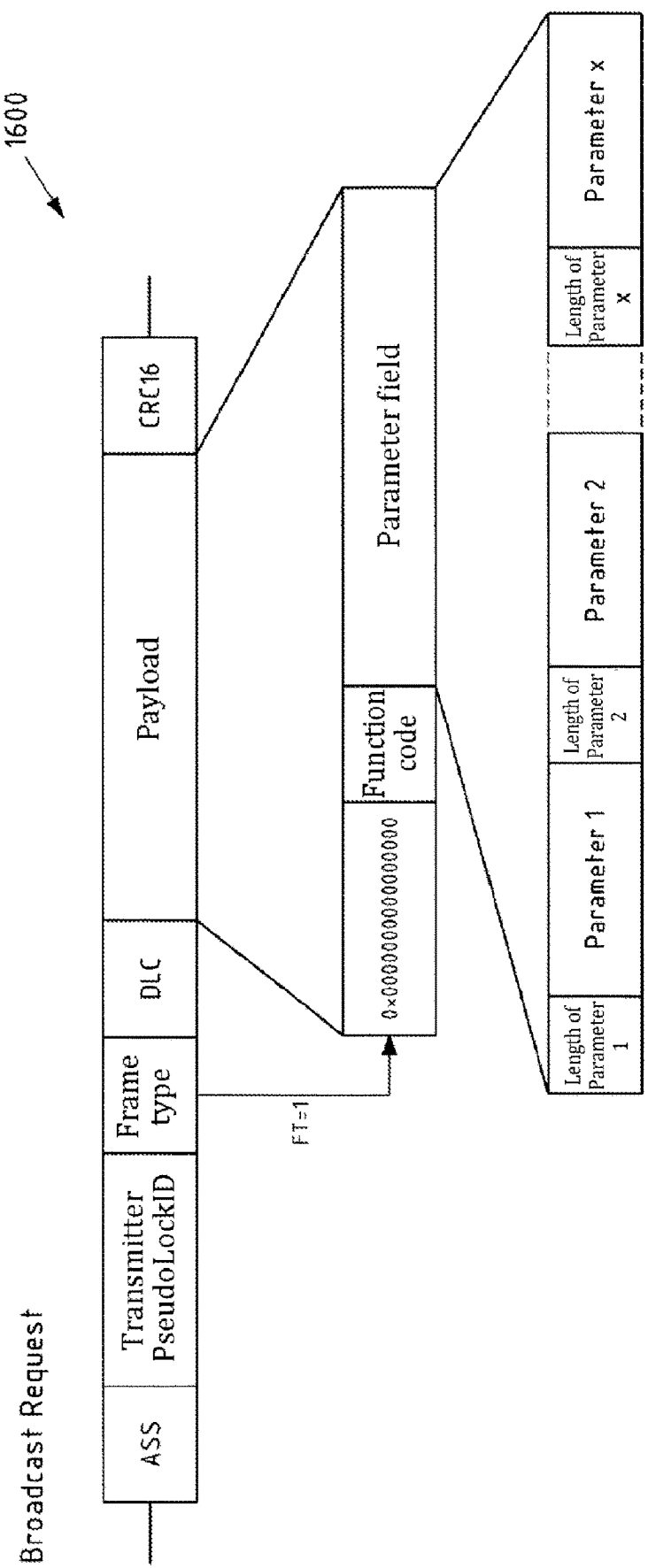
FIG. 16 shows a schematic illustration of a broadcast request message transmitted on the communication layer in one exemplary embodiment of a bus according to the invention.

The protocol relating to how the payload field of the message object 1200 from FIG. 12 can be respectively structured on the communication layer above the data link layer is now described with reference to FIGS. 14-16. It also applies to this specification of the payload field that it is not tied to the ILDB and can likewise also be used on other bus types.

3. Communication Layer 3.1 Request (Request Message)

Figure 14:
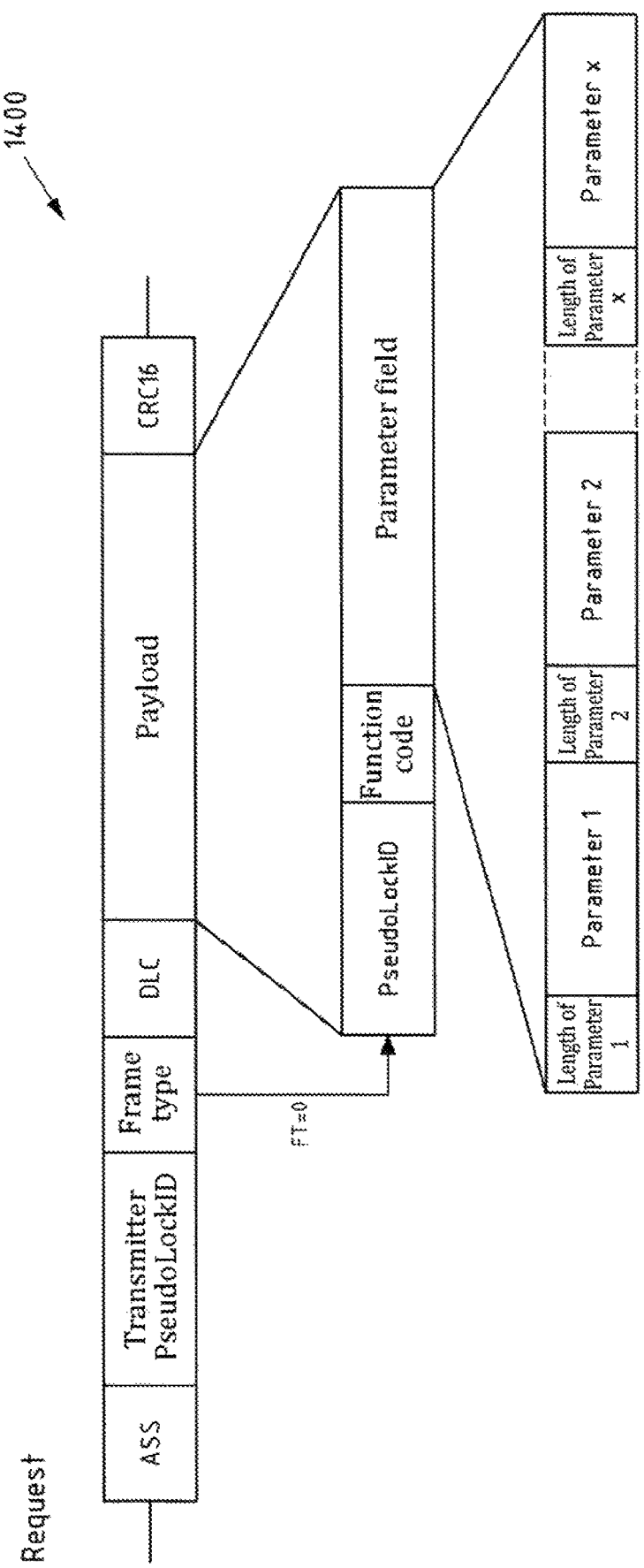
FIG. 14 shows a schematic illustration of a request message transmitted on the communication layer in one exemplary embodiment of a bus according to the invention.

In order to specifically transmit the messages to a subscriber on the ILDB, the payload field of the message 1200 (see FIG. 12) is structured as shown in FIG. 14. The following elements are present in this request message 1400:
Receiver PseudoLockID: unique PseudoLockID of the receiver to which the request is addressed. This field has a length of eight bytes, for example.
Function code: defined function code of the function to be performed in the receiver (lock control unit).
Parameter field: this field contains the function parameters for the requested function. The parameters are entered next to one another, for example always with a length statement in bytes and a parameter value. The parameter field may contain 0 . . . x function parameters. The number of parameters is (implicitly) defined via the corresponding function code.

3.2 Response (Response Message)

Each request is received and processed by the associated receiver and is acknowledged with a response message 1500. The response message 1500 is constructed as shown in FIG. 15, with the following elements:
Receiver PseudoLockID: PseudoLockID of the receiver acting as the transmitter of the response message in this case.
Transmitter PseudoLockID: PseudoLockID of the transmitter which has transmitted the request.
Function code: defined function code of the function which is requested and performed. If the stated function code is not supported by the receiver, a response message of the Response CANCEL type is returned. A response message of the Response ACK type is returned only if the function could be correctly performed. If the function could not be performed on account of incorrect parameters or other reasons, a Response NACK response is returned.
Result field: this field contains the function return value. This value is entered in this field with the length statement in bytes. If there is no return value (not every function returns a value), only the length byte of 0 is returned, for example.

3.3 Broadcast request (broadcast request message)

In addition to the directly addressed requests, general requests can also be transmitted to all bus subscribers on the ILDB. These so-called broadcast request messages 1600 are structured as shown in FIG. 16. With the exception of the receiver ID, this request has an identical structure to the request message 1400 from FIG. 14. Since the receiver is not known here, the receiver ID is set to zero.

3.4 Broadcast Response Message

If one or more receivers obtain a matching broadcast request message, this is acknowledged with a broadcast response message. In terms of structure, this response is identical to the normal response message 1500 in FIG. 15 and is therefore not illustrated in its own figure. However, only Response-ACK responses are returned here by the subscribers. Subscribers which cannot process the request do not return a response in this case. This behavior was selected in order to keep the access time on the ILDB as short as possible and in order to avoid loading the bus with unnecessary messages.

4. Application Layer

The lock control unit 8 supports various functions which can be initiated by the control unit 7. Each function has a permanently defined function code with a defined number of parameters and return values, as has already been explained above with respect to FIGS. 14-16.

Examples of these functions are explained below. These functions are not restricted to the use in connection with the ILDB, but rather may likewise be transmitted via a CAN bus or another bus.

4.1 GET_PSEUDO_LOCK_ID

This function is used by the control unit 7 in order to obtain the PseudoLockID of one or more lock control units 8. Since the compartment system is operational without having to set the compartment configuration, the control unit 7 initially does not know any compartments of the compartment system 1. As a result of this function, the control unit 7 can specifically search for compartments which satisfy particular criteria. If one or more lock control units satisfy the criteria sought, they report back their PseudoLockID and can be directly addressed by the control unit 7 from then on. This may also be used in step 703 in FIG. 7, for example, to initially identify the PseudoLockID of the lock control unit which has stored the value LockID as TempLockID and to then directly address the lock control unit identified in this manner with the PseudoLockID, for example using the OPEN_BOX function described below.

The function has the following characteristics:
Message type: Broadcast request
Function code: 1
Parameter 1: ParameterType
Parameter 2: ParameterValue
Parameter 3: ComparisonType
Return value: none The parameter ParameterType indicates the position in the parameter table of the lock control unit whose value is intended to be checked. This parameter table contains, for example, all lock-relevant parameters, for example TempLockID, compartment type, compartment state, UserInput, OpenCount, etc. (a subset of these parameters is illustrated in FIG. 4, for example, for the lock control unit of a mail compartment and a parcel compartment). Each parameter has a fixed position (0 . . . x) inside this table. The parameter ParameterType indicates this position. This position is defined as common enum, for example, inside the software, with the result that no numerical values have to be transferred here.

The ParameterValue indicates the value for which the selected parameter from the table is checked.

The ComparisonType indicates the type of comparison which is used to compare the selected parameter with the value, that is to say, for example, greater than, greater than or equal to, less than, less than or equal to, equal to, not equal to, etc. This value is also stored as common enum in the software, for example, with the result that abstractions can be used here.

If a lock control unit satisfies the desired criteria, this lock control unit transmits a response message of the Response-ACK type without a function return value. The response message then contains the PseudoLockID of the lock.

4.2 GET_TEMP_LOCK_ID

This function is used by the control unit 7 to search for compartments which are allocated to a particular TempLockID, that is to say are allocated to a particular user (that is to say their TempLockID is set to the value of a LockID of a user). There is only one parameter here as the filter criterion. This parameter can be used to select whether only allocated parcel compartments, only allocated mail compartments or all allocated compartments are intended to be reported back. This can be used in step 703 in FIG. 7, for example, to initially identify the PseudoLockID of the lock control unit which has stored the value LockID as TempLockID and then to directly address the lock control unit identified in this manner with the PseudoLockID, for example using the OPEN_BOX function described below.

The function has the following characteristics:
Message type: Broadcast request
Function code: 2
Parameter 1: TempLockID
Parameter 2: BoxSelect
Return value: DoorOpenCount The parameter TempLockID indicates the TempLockID (or LockID) of the user to whom the lock control units must be allocated.

The parameter BoxSelect can be used as a filter if, for example, only the mail compartment, only the parcel compartment or both compartments belonging to the desired user is/are being searched for.

If a lock control unit satisfies the desired criteria, it reports back with a response message of the Response-ACK type. The current opening counter of the lock control unit is returned as the return value.

4.3 GET_EMPTY_BOX

This function can be used by the control unit 7 in order to search for empty compartments of a particular type (cf., for example, step 510 in FIG. 5 or step 604 in FIG. 6). The parameter is used to indicate which compartment type is being searched for. All lock control units whose compartments do not contain any parcels and correspond to the compartment type being searched for report back in response to this request. The opening counter of the compartment is additionally concomitantly returned here in order to make it possible for the control unit 7 to make a selection on the basis of the opening frequency (for example in order to avoid wear).

The function has the following characteristics:
Message type: Broadcast request
Function code: 3
Parameter 1: BoxType
Return value: DoorOpenCount The parameter BoxType selects the compartment type (for example size S, M, L, XL, mail compartment, etc.) of which empty compartments are being searched for. This parameter is defined as common enum in the software, for example, and can be used by means of abstraction.

All empty compartments of the compartment type being searched for report back with a response message of the Response-ACK type. The compartments additionally return their current opening counter as the return value. Each lock control unit concomitantly counts the opening operations it has performed since the production time. This counter cannot be deleted.

4.4 SET_TEMP_LOCK_ID

This function can be used by the control unit 7 to allocate a particular compartment to a user (cf., for example, step 523 in FIG. 5 or step 617 in FIG. 6). This function writes the transmitted LockID to the non-volatile memory (TempLockID) of the lock control unit and therefore allocates it to a user.

The function has the following characteristics:
Message type: Request
Function code: 4
Parameter 1: LockID
Parameter 2: CMAC
Return value: none The parameter LockID indicates the LockID of the user to whom the lock control unit (and therefore a compartment) is intended to be allocated.

If the lock control unit has stored the LockID as TempLockID, it returns a response message of the Response-ACK type. If the LockID could not be stored, the lock control unit returns a response of the Response-NACK type.

The parameter CMAC is used to validate authorized access to the lock control unit. This AES128 CMAC is calculated using a special key and is concomitantly transmitted. The lock control unit repeats this calculation and compares the two values. The new LockID is accepted into the TempLockID only if both values match.

4.5 CLR_TEMP_LOCK_ID

This function can be used by the control unit 7 to release a particular compartment allocated to a user again (cf., for example, step 710 in FIG. 7). This function deletes the entered TempLockID of a lock control unit and therefore marks it as empty.

The characteristics are:
Message type: Request
Function code: 5
Parameter 1: CMAC
Return value: none If the lock control unit has deleted the TempLockID, it returns a response message of the Response-ACK type. If the TempLockID could not be deleted, the lock control unit returns a response of the Response-NACK type.

The parameter CMAC is again used to validate authorized access to the lock control unit, as already explained above.

4.6 GET_VALUE

This function can be used by the control unit 7 to read one or more parameters from the parameter table of the lock control unit (for example in step 503 in FIG. 5 in order to first of all determine the PseudoLockIDs of the lock control units having Userinputs=TRUE and to then specifically address these lock control units using the OPEN_BOX command (see below)), having the following characteristics:
Message type: Request
Function code: 6
Parameter 1: FirstParameter
Parameter 2: NumberOfParameters
Return value: parameter list The parameter FirstParameter indicates the position of the first parameter to be read in the parameter table of the lock control unit.

The parameter NumberOfParameters indicates the number of parameters which are intended to be read from the parameter table of the lock control unit, starting with FirstParameter.

The lock control unit returns a response message of the Response-ACK type. All parameters, without separation, are returned as the return value in the form of a list. If the parameters FirstParameter and NumberOfParameters are not in the valid range, a response message of the Response-NACK type is transmitted.

4.7 SET_VALUE

This function can be used by the control unit 7 to change a value in the parameter table of the lock control unit (for example in order to cause the situation in which the value "Userinputs" is set to True in step 618 in FIG. 6). This function can be applied only to the parameters which have been released with write access in the lock control unit.

The changeable parameters are at predetermined positions, for example. All other parameters have only read access, for example.

The function has the following characteristics:
Message type: Request
Function code: 7
Parameter 1: ParameterType
Parameter 2: ParameterValue
Parameter 3: CMAC
Return value: none The parameter ParameterType indicates the position in the parameter table of the lock control unit, the value of which is intended to be written. This position is defined as common enum inside the software, for example, with the result that no numerical values have to be transferred here.

The parameter ParameterValue indicates the value which is written to the selected parameters in the table.

The parameter CMAC is again used to validate authorized access to the lock control unit, as already explained.

If the lock control unit could write the new value, it returns a response message of the Response-ACK type. If the parameter could not be written, the lock control unit returns a response of the Response-NACK type.

4.8 OPEN_BOX

This function can be used by the control unit 7 to open a particular compartment (cf., for example, step 517 in FIG. 5). For this purpose, the compartment having the Pseudo-LockID is addressed. This function starts the process of opening the lock control unit. The conclusion of the opening process is reported back separately by the lock control unit via the change in the compartment state since the opening process can last for several seconds.

The function has the following characteristics:
Message type: Request
Function code: 8
Parameter 1: CMAC
Return value: none The parameter CMAC is again used to validate authorized access to the lock control unit, as already explained.

If the lock control unit has started the opening process, it returns a response message of the Response-ACK type. If the process could not be started on account of incorrect parameters, Response-NACK is returned as a response message.

4.9 STAY_BOX_OPEN

This function can be used by the control unit 7 to block a compartment which is already open, with the result that it can no longer be closed (that is to say to electronically deactivate the locking, for example, as described above with respect to step 804 in FIG. 8, for example). The prerequisite for activating this function is that the compartment door is open. Otherwise, the function is not performed since this would result in the undesired opening of the compartment door. This function is automatically deactivated, for example, if the power supply fails or after the locks have been disconnected.

The function has the following characteristics:
Message type: Request
Function code: 9
Parameter 1: Enable
Return value: none The parameter Enable switches the door hold-open function on or off. If the value 1 is transferred here, the function is activated. If 0 is transmitted as the value, the function is deactivated.

If the lock control unit returns a response message of the Response-ACK type, Enable=1 and the door is open. If Enable=0, a response message of the Response-ACK type is always returned. If Enable=1 is transmitted and the door is not open or the lock control unit is in a fault state, the response message Response-NACK is returned.

4.10 SET_BOX_TYPE

This function is used, for example during production, to write the compartment type to the lock control unit. This information is written only during the end-of-line test during production, for example.

The function has the following characteristics:
Message type: Request
Function code: 10
Parameter 1: BoxType
Return value: none The parameter BoxType again indicates the compartment type for which the lock control unit is intended to be configured. Examples of compartment types have already been mentioned above. The value is stored in a non-volatile manner in the lock control unit, for example. This parameter is performed as an OTP (one-time programmable) parameter, for example, in the final version of the firmware.

If the lock control unit has stored the value, it returns a response message of the Response-ACK type. If the value could not be stored on account of incorrect parameters or technical problems, Response-NACK is returned as the response message.

4.11 NEW_BOX_STATE

Normally, the lock control unit acts as slave and waits for function calls from the master (control unit 7). However, there is an exception in which the lock control unit acts as master on the bus and independently transmits a function call to the control unit 7. This is the state change of the compartment. If a compartment door is closed, for example, this event is reported to the control unit 7 by the lock control unit without the control unit 7 previously having to request this (cf., for example, step 521 in FIG. 5).

The function has the following characteristics:
Message type: Request (lock control unit→control unit)
Function code: 0
Parameter 1: BoxType
Parameter 2: BoxState
Return value: none The parameter BoxType again indicates the compartment type for which the lock control unit is configured. This value serves to inform the control unit 7.

The parameter BoxState indicates the new compartment state to which the lock control unit has changed, for example "unknown", "compartment closed and locked", "compartment open and locking deactivated", "compartment open", "lock defective".

The control unit 7 must return a response message of the Response-ACK type.

The following are furthermore intended to be disclosed as exemplary embodiments of the present invention:
Exemplary Embodiments 1-23: The embodiments defined in claims 1-23.

Exemplary Embodiment 24

Method comprising
detecting, at a lock control unit assigned to a compartment of a compartment system comprising a control unit and a plurality of compartments and lock control units assigned to the compartments and configured to communicate with the control unit, that the compartment has been closed or that at least one shipment from or for a person has been placed in the compartment and the compartment has been closed,
transmitting at least one piece of information identifying the lock control unit to the control unit if it has been detected that the compartment has been closed or that at least one shipment from or for a person has been placed in the compartment and the compartment has been closed,
obtaining a first identifier, which is associated at least with one person, from the control unit, and
storing the first identifier in the lock control unit

Exemplary Embodiment 25

Method according to exemplary embodiment 24, wherein, at a time at which it is detected that the compartment has been closed or that at least one shipment from or for a person has been placed in the compartment and the compartment has been closed, no identifier associated with a person is stored in the lock control unit

Exemplary Embodiment 26

Method according to either of exemplary embodiments 23-24, further comprising:
causing opening of the compartment before detecting that the compartment has been closed or that at least one shipment from or for a person has been placed in the compartment and the compartment has been closed.

Exemplary Embodiment 27

Method according to one of exemplary embodiments 24-26, further comprising:
providing, in response to a request from the control unit, a piece of information identifying the lock control unit if the lock control unit does not store an identifier associated with a person,
obtaining a request from the control unit to open the compartment assigned to the lock control unit, wherein the request contains the information identifying the lock control unit, and
causing the opening of the compartment assigned to the lock control unit

Exemplary Embodiment 28

Method according to one of exemplary embodiments 24-27, further comprising:
obtaining a request to open the compartment assigned to the lock control unit if the lock control unit stores a piece of information indicating that the compartment contains a shipment for collection and/or an identifier associated with a person,
causing the opening of the compartment if the lock control unit stores a piece of information indicating that the compartment contains a shipment for collection and/or an identifier associated with a person, and
deleting the information indicating that the compartment contains a shipment for collection and/or the identifier associated with a person.

Exemplary Embodiment 29

Method according to exemplary embodiment 28, wherein the opening and the deleting are carried out before detecting that one compartment of the plurality of compartments has been closed or that at least one shipment from or for the person has been placed in one compartment of the plurality of compartments and the compartment has been closed.

Exemplary Embodiment 30

Method according to one of exemplary embodiments 24-29, further comprising:
storing a piece of information indicating that the compartment contains at least one shipment for collection in the lock control unit.

Exemplary Embodiment 31

Method according to one of exemplary embodiments 24-30, further comprising:
obtaining a second identifier, which is associated with at least one person and either matches the first identifier or differs from the latter, from the control unit, and
causing opening of the compartment and deleting of the first identifier from the lock control unit if the second identifier obtained matches the first identifier stored in the lock control unit.

Exemplary Embodiment 32

Method according to exemplary embodiment 31, wherein the compartment is a parcel compartment

Exemplary Embodiment 33

Method according to one of exemplary embodiments 24-32, wherein the lock control units communicate with the control unit via a bus, in particular a CAN bus or an ILDB.

Exemplary Embodiment 34

Method according to exemplary embodiment 33, wherein further lock control units can be connected to the bus for the purpose of communicating with the control unit without any changes to the control unit being required with regard to communication.

Exemplary Embodiment 35

Method according to one of exemplary embodiments 24-34, wherein the compartment system is part of a delivery and/or collection system comprising a plurality of delivery and/or collection containers associated with respective identifiers and a central unit for providing access authorizations associated with the respective identifiers for the delivery and/or collection containers, wherein the format of the first identifier corresponds to the format of the identifiers associated with the delivery and/or collection containers, and wherein by storing the first identifier in a lock control unit of the compartment system, the compartment assigned to the lock control unit can be handled from the point of view of the central unit like an individual delivery and/or collection container with regard to the access authorizations.

Exemplary Embodiment 36

Method according to one of exemplary embodiments 24-35, wherein the first identifier is included in access authorization information which comprises one or more access authorization parameters, including the first identifier, and the authenticity and/or integrity of which can be checked using a key stored in the control unit

Exemplary Embodiment 37

Method according to exemplary embodiment 36, wherein the access authorization information containing the first identifier is provided by a delivery agent wishing to place at least one shipment for the person associated with the first identifier in the compartment system or by the person who is associated with the first identifier and wishes to place at least one shipment for collection by a delivery agent in the compartment system or by a device belonging to the delivery agent or to the person.

Exemplary Embodiment 38

Computer program comprising program instructions which cause a processor to perform and/or control the method according to one of exemplary embodiments 1-37 when the computer program runs on the processor.

Exemplary Embodiment 39

Apparatus configured to perform and/or control the method according to one of exemplary embodiments 1-23 or comprising respective means for performing and/or controlling the steps of the method according to one of exemplary embodiments 1-23.

Exemplary Embodiment 40

Apparatus according to exemplary embodiment 39, wherein the apparatus is the control unit.

Exemplary Embodiment 41

Apparatus configured to perform and/or control the method according to one of exemplary embodiments 24-37 or comprising respective means for performing and/or controlling the steps of the method according to one of exemplary embodiments 24-37.

Exemplary Embodiment 42

Apparatus according to exemplary embodiment 41, wherein the apparatus is the lock control unit.

Exemplary Embodiment 43

Compartment system comprising the control unit according to exemplary embodiment 40 and a plurality of lock control units according to exemplary embodiment 42.

Exemplary Embodiment 44

Use of a compartment system according to exemplary embodiment 43 for placing, in particular delivering, and/or collecting shipments.

The exemplary embodiments of the present invention described in this specification are also intended to be understood as having been disclosed in all combinations with one another. In particular, in the present case, the description of a feature included in an embodiment is also not intended to be understood as meaning that the feature is indispensable or essential for the function of the exemplary embodiment, unless explicitly explained to the contrary. The sequence of the method steps outlined in this specification in the individual flowcharts is not imperative, and alternative sequences of the method steps are conceivable. The method steps can be implemented in different ways, and implementation in software (by virtue of program instructions), hardware or a combination of the two is conceivable for implementing the method steps. Terms used in the patent claims such as "comprise", "have", "contain", "include" and the like do not exclude further elements or steps. The wording "at least partially" covers both the "partially" case and the "completely" case. The wording "and/or" is intended to be understood as meaning that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device can perform the functions of multiple units or devices cited in the patent claims. Reference symbols specified in the patent claims are not intended to be regarded as limitations for the means and steps used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus comprising at least one processor and at least one memory which contains program code, wherein the memory and the program code are configured to cause an apparatus with the at least one processor to perform and/or control at least:

obtaining a first identifier, which is associated with at least one person, at a control unit of a compartment system which, in addition to the control unit, has a plurality of compartments provided with respective locks and lock control units which are respectively assigned to the compartments and are configured to communicate with the control unit, obtaining, at the control unit, after obtaining the first identifier, information indicating that one compartment of the plurality of compartments has been closed or that at least one shipment from or for the person has been placed in one compartment of the plurality of compartments and the compartment has been closed, wherein the information is obtained using one or more sensors which are part of the lock control unit or communicatively connected to the lock control unit, and causing, by the control unit, storing of the first identifier in the lock control unit assigned to the compartment, wherein the causing of the storing of the first identifier in the lock control unit assigned to the compartment is caused by the obtaining of the information indicating that the compartment of the plurality of compartments has been closed or that at least one shipment from or for the person has been placed in a compartment of the plurality of compartments and the compartment has been closed, or depends on further factors.

2. The apparatus according to claim 1, wherein information indicating that the compartment of the plurality of compartments has been closed or that at least one shipment from or for the person has been placed in a compartment of the plurality of compartments and the compartment has been closed is obtained after the obtaining of a first identifier, which is associated with at least one person, at a control unit of a compartment system.

3. The apparatus according to claim 1, wherein, at a time at which the information indicating that the compartment has been closed or that at least one shipment from or for a person has been placed in the compartment and the compartment has been closed is obtained, no identifier associated with a person is stored in the lock control unit assigned to the compartment.

4. The apparatus according to claim 1, wherein the memory and the program code are further configured to cause the apparatus with the at least one processor to perform and/or control:

causing that before obtaining the information indicating that one compartment of the plurality of compartments has been closed or that at least one shipment from or for a person has been placed in the compartment and the compartment has been closed, at least this compartment is open.

5. The apparatus according to claim 1, wherein the memory and the program code are further configured to cause the apparatus with the at least one processor to perform and/or control:

causing opening of at least one other compartment after obtaining the information indicating that one compartment of the plurality of compartments has been closed or that at least one shipment from or for a person has been placed in the compartment and the compartment has been closed and/or after the storing of the first identifier in the lock control unit assigned to the compartment has been caused, wherein no identifier associated with a person is stored in the lock control unit assigned to the other compartment.

6. The apparatus according to claim 1, wherein the compartments of the plurality of compartments have at least two different sizes, and wherein the memory and the program code are further configured to cause the apparatus with the at least one processor to perform and/or control:
causing that, before obtaining the information indicating that one compartment of the plurality of compartments has been closed or that at least one shipment from or for a person has been placed in the compartment and the compartment has been closed, at least one compartment of each size is open.

7. The apparatus according to claim 1, wherein the memory and the program code are further configured to cause the apparatus with the at least one processor to perform and/or control:
causing opening of one or more compartments, the respectively assigned lock control units of which store a piece of information indicating that they contain at least one shipment for collection and/or an identifier associated with a person, and
causing, for the lock control units of the one or more compartments, deleting of the information indicating that they contain at least one shipment for collection and/or the identifier associated with a person.

8. The apparatus according to claim 7, wherein the causing of the opening and the causing of the deleting are carried out after the obtaining of the first identifier and before the obtaining of the information indicating that one compartment of the plurality of compartments has been closed or that at least one shipment from or for the person has been placed in one compartment of the plurality of compartments and the compartment has been closed.

9. The apparatus according to claim 1, wherein the memory and the program code are further configured to cause the apparatus with the at least one processor to perform and/or control:
causing storing of a piece of information indicating that the compartment contains at least one shipment for collection in the lock control unit assigned to the compartment.

10. The apparatus according to claim 1, wherein the memory and the program code are further configured to cause the apparatus with the at least one processor to perform and/or control:
obtaining a second identifier, which is associated with at least one person and either matches the first identifier or differs from the latter, at the control unit,
causing opening of one or more compartments, in the respectively assigned lock control units of which the second identifier is stored, and causing deleting of the second identifier from one or more of the lock control units assigned to the one or more compartments.

11. The apparatus according to claim 1, wherein the memory and the program code are further configured to cause the apparatus with the at least one processor to perform and/or control:
obtaining a third identifier, which is associated with at least one person and either matches the first identifier or differs from the latter, at the control unit, wherein at least one compartment for a plurality of placement and/or collection processes is statically allocated, rather than respectively dynamically allocated, to the third identifier by storing the third identifier for the plurality of placement and/or collection processes in the lock control unit assigned to this compartment, and
causing opening of this compartment.

12. The apparatus according to claim 1, wherein the lock control units communicate with the control unit via a bus.

13. The apparatus according to claim 12, wherein further lock control units are connectable to the bus for the purpose of communication with the control unit without the need for any changes to the control unit with regard to the communication.

14. The apparatus according to claim 1, wherein the compartment system is part of a delivery and/or collection system comprising a plurality of delivery and/or collection containers associated with respective identifiers and a central unit for providing access authorizations associated with the respective identifiers for the delivery and/or collection containers, wherein the format of the first identifier corresponds to the format of the identifiers associated with the delivery and/or collection containers, and wherein by storing the first identifier in a lock control unit of the compartment system, the compartment assigned to the lock control unit can be handled from the point of view of the central unit like an individual delivery and/or collection container with regard to the access authorizations.

15. The apparatus according to claim 1, wherein the first identifier is included in access authorization information, which comprises one or more access authorization parameters including the first identifier, and whose authenticity and/or integrity can be checked using a key stored in the control unit.

16. The apparatus according to claim 15, wherein for a plurality of different instances of the first identifier, which are obtainable at the control unit and are respectively associated with different persons, respectively associated different keys are stored in the control unit.

17. The apparatus according to claim 15, wherein the access authorization information containing the first identifier is provided by a delivery agent wishing to place at least one shipment for the person associated with the first identifier into the compartment system, or is provided by the person who is associated with the first identifier and wishes to place at least one shipment for collection by a delivery agent into the compartment system, or is provided by a device belonging to the delivery agent or to the person.

18. The apparatus according to claim 1, wherein the memory and the program code are further configured to cause the apparatus with the at least one processor to perform and/or control:
causing, by the control unit, storing of the first identifier in the lock control unit assigned to the compartment, wherein the causing of the storing of the first identifier in the lock control unit assigned to the compartment depends on the obtaining of information indicating that a particular interaction with a user interface of the compartment system has taken place.

19. The apparatus according to claim 1, wherein the lock control units communicate with the control unit via a CAN bus.

20. The apparatus according to claim 1, wherein the one or more sensors detect that the compartment of the plurality of compartments has been closed based on sensing of a magnetic field using a Hall sensor.

21. The apparatus according to claim 1, wherein each of the respective locks comprises an electromechanical solenoid which actuates an unlocking lever via a plunger.

22. The apparatus according to claim 21, wherein the information obtained is based on a detected position of the unlocking lever.

23. An apparatus comprising at least one processor and at least one memory which contains program code, wherein the memory and the program code are configured to cause an apparatus with the at least one processor to perform and/or control at least:

- detecting, at a lock control unit assigned to a compartment of a compartment system comprising a control unit and a plurality of compartments provided with respective locks and lock control units assigned to the compartments and configured to communicate with the control unit, that the compartment has been closed or that at least one shipment from or for a person has been placed in the compartment and the compartment has been closed, wherein for detecting one or more sensors, which are part of the lock control unit or communicatively connected to the lock control unit, are used,
- transmitting at least a piece of information identifying the lock control unit to the control unit if it has been detected that the compartment has been closed or that at least one shipment from or for a person has been placed in the compartment and the compartment has been closed,
- obtaining, upon the transmitting of at least the piece of information identifying the lock control unit to the control unit, a first identifier, which is associated at least with one person, from the control unit,
- storing the first identifier in the lock control unit,
- obtaining, by the lock control unit, a request to open the compartment assigned to the lock control unit if the lock control unit stores a piece of information indicating that the compartment contains a shipment for collection and/or an identifier associated with a person,
- causing, by the lock control unit, opening of the compartment if the lock control unit stores a piece of information indicating that the compartment contains a shipment for collection and/or an identifier associated with a person, and
- deleting, by the lock control unit, the information indicating that the compartment contains a shipment for collection and/or the identifier associated with the person.

24. The apparatus according to claim 23, wherein the memory and the program code are further configured to cause the apparatus with the at least one processor to perform and/or control:

- obtaining a second identifier, which is associated with at least one person and either matches the first identifier or differs from the latter, from the control unit, and
- causing opening of the compartment and deleting of the first identifier from the lock control unit if the obtained second identifier matches the first identifier stored in the lock control unit.

25. A method comprising:

detecting, at a lock control unit assigned to a compartment of a compartment system comprising a control unit and a plurality of compartments provided with respective locks and lock control units assigned to the compartments and configured to communicate with the control unit, that the compartment has been closed or that at least one shipment from or for a person has been placed in the compartment and the compartment has been closed, wherein for detecting one or more sensors, which are part of the lock control unit or communicatively connected to the lock control unit, are used,
transmitting at least a piece of information identifying the lock control unit to the control unit if it has been detected that the compartment has been closed or that at least one shipment from or for a person has been placed in the compartment and the compartment has been closed,
obtaining, upon the transmitting of at least the piece of information identifying the lock control unit to the control unit, a first identifier, which is associated at least with one person, from the control unit,
storing the first identifier in the lock control unit,
obtaining, by the lock control unit, a request to open the compartment assigned to the lock control unit if the lock control unit stores a piece of information indicating that the compartment contains a shipment for collection and/or an identifier associated with a person,
causing, by the lock control unit, opening of the compartment if the lock control unit stores a piece of information indicating that the compartment contains a shipment for collection and/or an identifier associated with a person, and
deleting, by the lock control unit, the information indicating that the compartment contains a shipment for collection and/or the identifier associated with the person.

* * * * *